United States Patent
Nakamura et al.

(10) Patent No.: US 8,335,143 B2
(45) Date of Patent: Dec. 18, 2012

(54) METHOD FOR INSPECTING OPTICAL INFORMATION RECORDING MEDIUM, INSPECTION APPARATUS, OPTICAL INFORMATION RECORDING MEDIUM AND RECORDING METHOD

(75) Inventors: Atsushi Nakamura, Osaka (JP); Kenji Fujiune, Osaka (JP); Yasumori Hino, Nara (JP)

(73) Assignee: Panasonic Corporation, Oska (JP)

( * ) Notice: Subject to any disclaimer, the term of this patent is extended or adjusted under 35 U.S.C. 154(b) by 0 days.

(21) Appl. No.: 13/204,384

(22) Filed: Aug. 5, 2011

(65) Prior Publication Data

US 2011/0296447 A1  Dec. 1, 2011

Related U.S. Application Data

(63) Continuation of application No. 12/272,114, filed on Nov. 17, 2008, which is a continuation-in-part of application No. 12/267,550, filed on Nov. 7, 2008, now Pat. No. 8,014,251, and a continuation-in-part of application No. 12/261,309, filed on Oct. 30, 2008, now Pat. No. 8,014,250.

(60) Provisional application No. 60/988,833, filed on Nov. 19, 2007.

(51) Int. Cl.
*G11B 7/00* (2006.01)

(52) U.S. Cl. .................................. 369/53.28; 369/53.35

(58) Field of Classification Search ................ 369/53.28, 369/53.35
See application file for complete search history.

(56) References Cited

U.S. PATENT DOCUMENTS

| | | |
|---|---|---|
| 5,568,467 A | 10/1996 | Inagaki et al. |
| 2002/0131350 A1 | 9/2002 | Kurobe et al. |
| 2002/0159351 A1* | 10/2002 | Tateishi ..................... 369/47.45 |
| 2004/0004923 A1 | 1/2004 | Hirai et al. |
| 2004/0222479 A1 | 11/2004 | Uno et al. |

(Continued)

FOREIGN PATENT DOCUMENTS

CN  1926611 A  5/2011

(Continued)

OTHER PUBLICATIONS

Blu-ray Disc Reader, published by Ohmsha, Ltd., pp. 13-28 with a concise explanation.
White paper, Blu-ray Disc Format, General, Aug. 2004, pp. 1-37.
White paper, Blu-ray Disc Format, 3. File System Specifications for BD-RE, R, ROM, Aug. 2004, pp. 1-6.

(Continued)

*Primary Examiner* — Latanya Bibbins
(74) *Attorney, Agent, or Firm* — Renner, Otto, Boisselle & Sklar, LLP

(57) ABSTRACT

A method for inspecting an optical information storage medium includes the steps of: irradiating the storage medium with a laser beam and rotating the medium by a constant linear velocity control technique by reference to the radial location at which the laser beam forms a spot on the medium; changing the rotational velocities according to the radial location on the medium between at least two linear velocities that include a first linear velocity Lv1 and a second linear velocity Lv2 higher than the first linear velocity Lv1; generating a focus error signal and/or a tracking error signal based on the light reflected from the medium; performing a focus control and/or a tracking control on the laser beam that irradiates the medium based on the focus and/or tracking error signal(s); and passing the branched outputs of control loops for the focus and/or tracking error signal(s) through predetermined types of frequency band-elimination filters for the focus and/or tracking error signal(s) to obtain residual errors of the focus and/or tracking error signal(s) and comparing the residual errors to predetermined reference values.

5 Claims, 7 Drawing Sheets

U.S. PATENT DOCUMENTS

| | | |
|---|---|---|
| 2005/0063264 A1 | 3/2005 | Miyamoto et al. |
| 2007/0121444 A1 | 5/2007 | Takeda et al. |
| 2007/0274178 A1 | 11/2007 | Kuroda |
| 2008/0219116 A1 | 9/2008 | Narumi |

FOREIGN PATENT DOCUMENTS

| | | |
|---|---|---|
| EP | 1 168 320 A2 | 1/2002 |
| EP | 1 244 097 A2 | 9/2002 |
| JP | 06-044595 | 2/1994 |
| JP | 09-251709 | 9/1997 |
| JP | 3819138 | 8/1999 |
| JP | 2002-324322 | 11/2002 |
| JP | 2004-005817 | 1/2004 |
| JP | 2004-362748 | 12/2004 |
| JP | 2005-100482 | 4/2005 |
| WO | 2004/064056 A1 | 7/2004 |
| WO | 2005/088611 | 9/2005 |

OTHER PUBLICATIONS

White paper, Blu-ray Disc Format, 4. Key Technologies, Aug. 2004, pp. 1-8.

International Search Report for Application No. PCT/JP2008/003372 dated Feb. 24, 2009.

Form PCT/ISA/237 and a partial English translation for Application No. PCT/JP2008/003372 dated Feb. 24, 2009.

European Search Report for Application No. EP 08 85 1136 dated Jan. 31, 2011 (relating to U.S. Appl. No. 12/272,114).

Co-pending related U.S. Appl. No. 12/261,309, filed Oct. 30, 2008.

Co-pending related U.S. Appl. No. 12/267,550, filed Nov. 7, 2008.

China Office Action, Application No. 200880002596.1, dated May 25, 2011 (relating to U.S. Appl. No. 12/272,114), with English translation.

Co-pending related U.S. Appl. No. 12/272,114, filed Nov. 17, 2008.

* cited by examiner

METHOD FOR INSPECTING OPTICAL INFORMATION RECORDING MEDIUM, INSPECTION APPARATUS, OPTICAL INFORMATION RECORDING MEDIUM AND RECORDING METHOD

BACKGROUND OF THE INVENTION

1. Field of the Invention

The present invention relates to a method and apparatus for inspecting an optical information storage medium, an optical information storage medium, and a method of writing information on such a medium. More particularly, the present invention relates to a method and apparatus for inspecting an optical information storage medium on which a read/write operation needs to be performed at high rates and also relates to a method for inspecting such an optical information storage medium for residual focus and tracking errors.

2. Description of the Related Art

An optical information storage medium has a storage layer on which information is written as pits or marks. That information can be read by irradiating the pits or marks with light and by detecting a variation in the intensity of the light reflected. Such an optical information storage medium normally has a disc shape, and therefore, is called an "optical disc". Thus, according to that normal practice, an optical information storage medium will be simply referred to herein as an "optical disc".

Nowadays, Blu-ray discs (BDs), digital versatile discs (DVDs) and other optical discs with high densities and big storage capacities have become increasing popular and have been used more and more extensively to store computer data, software, audiovisual data and so on.

Among those optical discs with high densities and big storage capacities, there are increasing demands on the market for write-once discs such as DVD-Rs and BD-Rs, in particular. A write-once optical disc may have a storage layer including a Te—O-M based material (where M is at least one element selected from the group consisting of metallic elements, metalloid elements and semiconductor elements) as disclosed in Japanese Patent Application Laid-Open Publication No. 2004-362748. The Te—O-M based material is a compound material, which includes Te, O and M and in which fine particles of Te, Te-M and M are randomly dispersed in a $TeO_2$ matrix of the as-deposited material. When the storage layer of such a material is irradiated with a laser beam with at least a predetermined intensity, the portion of the storage layer irradiated with the laser beam will melt to precipitate Te or Te-M crystals with large particle sizes while being cooling, thereby forming a recording mark on the storage layer. That portion where the crystals have been precipitated has a different optical property from the other portions. That is why when the recording mark is irradiated with a laser beam, a difference will be made on the intensity of the reflected light and the difference in the intensity of the reflected light can be detected as a signal. In this manner, a so-called "write-once operation", which allows the user to perform a write operation only once, can get done.

The rotational velocity of an optical disc can be controlled by a CLV (constant linear velocity) technique or a CAV (constant angular velocity) technique. Specifically, according to the CLV control technique, the rotational frequency of a given optical disc is controlled inversely proportional to the radial location and information is supposed to be written in response to a certain number of write channel clock pulses while making the scanning light beam follow the tracks at a constant linear velocity. On the other hand, according to the CAV control technique, the rotational frequency is kept constant even while data is being written on the optical disc but channel clock pulses are applied during writing as a reference signal to the optical disc at variable frequencies that are proportional to the radial location of the scanning light beam on the tracks. In that case, channel clock pulses are applied at low frequencies on the inside portion of the disc but are applied at high frequencies on the outside portion of the disc. Then the recording linear velocity will be low on the inside portion and high on the outside portion but recording marks will be left with a constant recording linear density.

In writing information on an optical disc or reading the information stored there from the disc, the optical disc needs to be irradiated with a laser beam that has been converged in a predetermined state. In such a situation, a type of control to be performed by an optical disc drive to keep the laser beam in such a predetermined converged state is called a "focus servo control", while another type of control to be performed by the optical disc drive to move the laser beam spot in the disc radial direction so as to follow the tracks, which are a series of marks left on the storage layer, is called a "tracking servo control". Also, a signal representing the magnitude of shift from the predetermined converged state of the laser beam in the focus servo control is called a "focus error signal". Likewise, a signal representing the magnitude of deviation of the laser beam from the target tracks in the tracking servo control is called a "tracking error signal". The tracking error is sometimes called a "radial tracking error" and the focus error is sometimes called an "axial tracking error".

For example, Japanese Patent Application Laid-Open Publication No. 2004-5817 and Japanese Patent Publication No. 3819138 disclose technologies relating to focus and tracking servo controls to be performed on a write-once optical disc. These documents disclose an optical disc drive and method for performing write processing with high reliability by controlling the write rate based on the focus error signal and other signals and a method for detecting the values of vibrations to be produced due to the eccentricity of the disc based on the tracking error signal.

Recently, particularly in computer peripheral devices and optical disc recorders that are compatible with optical discs with huge storage capacities, it is more necessary to get a write operation done at high transfer rates than anything else. Specifically, there is an increasing demand for development of a technique for reading or writing information at rates corresponding to 6× velocity for BDs. To achieve such high transfer rates, however, the optical disc should be scanned with a laser beam much more quickly by increasing the rotational frequency (or the linear velocity) of the disc. As used herein, the "× velocity", for example, means that the velocity is  times as high as the standard read/write rate. More specifically, the read/write rate is represented as either a linear velocity or a transfer rate. In this description, the read/write rate will be represented herein by the linear velocity in most cases.

Generally speaking, however, if the rotational frequency of a disc were increased, then the locations on the tracks where the information is written and the levels (i.e., heights) of the storage layer would change quickly due to out-of-plane vibrations, eccentricity, defects, variations in thickness distribution and other shape imperfections of the optical disc. Thus, the focus servo control and the tracking servo control should be performed even more quickly. However, there is a certain limit to the response of the servo control. That is why if the on-track locations or the levels of the storage layer changed at frequencies that are even higher than the quickest possible response of the servo control, then it would be impossible for the optical disc drive to get the focus servo control or the tracking servo control done perfectly. As a result, the tracking error signal would have an increased residual error (which will be referred to herein as a "residual tracking error"), thus decreasing the stability of the tracking servo. And the residual error of a focus error signal (which will be referred to herein as a "residual focus error") would also increase and the envelope of a write signal would have missing (or zero-amplitude) portions corresponding to the residual error to possibly decrease the symbol error rate (SER) significantly.

As used herein, the "residual tracking error" refers to a signal component to be produced in a situation where the tracking control has not been done quite successfully. That is to say, even if the optical disc drive is performing a tracking servo control appropriately enough, the laser beam may still be unable to follow the tracks perfectly to make the level of the tracking error signal not equal to zero, which is what is called a "residual tracking error". Likewise, the "residual focus error" refers to a signal component to be produced in a situation where the focus control has not been done quite successfully. That is to say, even if the optical disc drive is performing a focus servo control appropriately enough, the laser beam may still deviate from the predetermined converged state to make the level of the focus error signal not equal to zero, which is what is called "residual focus error". The residual error of each of these signals is estimated by the amplitude of that signal. And the optical disc drive represents the values of those residual errors by the magnitude of deviation of the laser beam spot from the center of the tracks and by that of shift of the focal point of the laser beam from the target storage layer, respectively. More specifically, these magnitudes are represented as distances (or lengths). That is why the tracking error signal may be represented as having a residual error of xx nm and the focus error signal may be represented as having a residual error of xx nm. It should be noted that the residual errors are sometimes called simply "residuals". In this description, when just "residual errors" are mentioned, the residual errors refer to both the residual tracking error and the residual focus error alike.

For these reasons, it is necessary to control the shape of a stamper to be used as a master to make an optical disc, the forming process of the optical disc, the viscosity of the resin material of its coating layer, and the thickness of a spin-coated film with even higher degrees of precision. Added to that, it is no less important to develop an inspecting method and apparatus that can efficiently and precisely determine whether or not the optical disc product just made has expected shape precision or mechanical properties.

However, if the spindle motor of such an inspecting apparatus carried out the inspection while rotating at six times as high velocities as normal BDs, then significant residual focus and tracking errors would be detected from mechanical factors of the inspecting apparatus itself, e.g., vibrations and resonance of the actuator. Then, it would be impossible to precisely measure the residual errors that have been caused due to the mechanical properties of the optical disc (or get the inspection done) just as originally intended. Nevertheless, if an expensive high-performance inspecting apparatus that would have reduced vibrations or actuator resonance were newly introduced, then investment on equipment should be newly made, thus eventually increasing the manufacturing cost of the media.

Also, if a write operation were performed by the CLV control technique on the entire surface of an optical disc at as high a linear velocity as 6× rate for BDs, then the rotational frequency of the spindle motor should be higher than 10,000 rpm on the inside portion of the disc. This is a problem because 10,000 rpm is the maximum allowable rotational frequency in practice that was determined from safety considerations in view of the rupture limit of plastic that is the substrate material of the disc. For that reason, the optical disc should not be inspected at such a high velocity as exceeding 10,000 rpm.

Furthermore, the residual errors of the tracking error signal or the focus error signal could be reduced by performing the servo controls with higher precision with the servo filter characteristic of the inspecting apparatus adjusted. However, an optical disc drive that performs a write operation on BDs at 4× linear velocity performs focus and tracking servo control operations using a servo filter that already has as high a gain intersection as 6 kHz to 8 kHz. For that reason, if the servo characteristic of the inspecting apparatus should have an even higher gain intersection to cope with the 6× linear velocity for BDs, then the actuator would have a decreased oscillation or phase margin, thus making it virtually impossible to secure servo stability.

In order to overcome the problems described above, the present invention has an object of providing a method and apparatus for precisely inspecting an optical information storage medium, on which a read/write operation should be performed at high linear velocities. Another object of the present invention is to provide a method of writing a signal of quality on such an optical information storage medium. Still another object of the present invention is to provide such an optical information storage medium.

SUMMARY OF THE INVENTION

A method for inspecting an optical information storage medium according to the present invention includes the steps of: irradiating the optical information storage medium with a laser beam and rotating the storage medium by a constant linear velocity control technique by reference to the radial location at which the laser beam forms a spot on the storage medium; changing the rotational velocities according to the radial location on the storage medium between at least two linear velocities that include a first linear velocity Lv1 and a second linear velocity Lv2, which is higher than the first linear velocity Lv1; generating a focus error signal and/or a tracking error signal based on the light reflected from the storage medium; performing a focus control and/or a tracking control on the laser beam that irradiates the storage medium based on the focus error signal and/or the tracking error signal; and passing the branched outputs of control loops for the focus error signal and/or the tracking error signal through predetermined types of frequency band-elimination filters for the focus and/or tracking error signal(s) to obtain residual errors of the focus and/or tracking error signal(s) and comparing the residual errors to predetermined reference values.

In one preferred embodiment, the comparison is made by rotating the optical information storage medium at the first linear velocity Lv1 at or inside of a predetermined radial location R on the storage medium but at the second linear velocity Lv2 outside of the predetermined radial location R on the storage medium.

In another preferred embodiment, the Lv2/Lv1 ratio of the second linear velocity Lv2 to the first linear velocity Lv1 is either 1.5 or 2.

In still another preferred embodiment, the first linear velocity Lv1 is a positive real number of times as high as 9.834 m/sec or 4.917 m/sec and/or the second linear velocity Lv2 is a positive real number of times as high as 14.751 m/sec or 4.917 m/sec.

In yet another preferred embodiment, if Lv2/Lv1=1.5, the predetermined radial location R satisfies 33 mm≦R≦36 mm but if Lv2/Lv1=2.0, the predetermined radial location R satisfies 44 mm≦R≦48 mm.

In yet another preferred embodiment, each of the first and second linear velocities is a half or less as high as the maximum one of linear velocities for reading and/or writing that are stored in advance in a predetermined area of the optical information storage medium.

In yet another preferred embodiment, the gain intersection of the servo characteristic of the focus control remains the same, no matter whether the optical information storage medium, being subjected to the focus control to make a comparison to the predetermined reference value, is rotated at the first linear velocity or the second linear velocity. The gain intersection of the servo characteristic of the tracking control also remains the same, no matter whether the optical information storage medium, being subjected to the tracking control to make a comparison to the predetermined reference value, is rotated at the first linear velocity or the second linear velocity.

In yet another preferred embodiment, the frequency band-elimination filter for the focus error signal includes a low-pass filter LPF with a cutoff frequency LPF_FcL and a band-pass filter BPF with a lower cutoff frequency BPF_FcL and a higher cutoff frequency BPF_FcH. The branched output of the control loop for the focus error signal is supplied to the low-pass filter LPF and the band-pass filter BPF. If the optical information storage medium is rotated at the first and second linear velocities and subjected to the focus control to make a comparison to the predetermined reference value, LPF_FcL, BPF_FcL and BPF_FcH are switched one after another according to the ratio of the second linear velocity to the first linear velocity.

In this particular preferred embodiment, the frequency band-elimination filter for the tracking error signal includes a low-pass filter LPF with a cutoff frequency LPF_TcL and a band-pass filter BPF with a lower cutoff frequency BPF_TcL and a higher cutoff frequency BPF_TcH. The branched output of the control loop for the tracking error signal is supplied to the low-pass filter LPF and the band-pass filter BPF. The cutoff frequencies LPF_TcL and BPF_TcL are constant irrespective of the first and second linear velocities. And BPF_FcH is switched one after another according to the ratio of the second linear velocity to the first linear velocity.

In a specific preferred embodiment, the output value F_LPF of the focus error signal that has passed through the LPF, the output value F_BPF of the focus error signal that has passed through the BPF, the output value T_LPF of the tracking error signal that has passed through the LPF, and the output value T_BPF of the tracking error signal that has passed through the BPF are all compared to their associated predetermined reference values.

In a more specific preferred embodiment, when compared to the predetermined reference values according to the radial location, the four output values F_LPF, F_BPF, T_LPF and T_BFP are compared to two sets of reference values that are defined for the first and second linear velocities, respectively.

In this particular preferred embodiment, the reference value for F_LPF at the second linear velocity is equal to or greater than the reference value for F_LPF at the first linear velocity.

In yet another preferred embodiment, the intensity of the laser beam remains the same irrespective of the linear velocity.

An optical information storage medium according to the present invention is designed to read and/or write information optically from/on it. When the optical information storage medium is subjected to a predetermined inspection with information about a velocity that is k times (where k is a positive real number) as high as a standard read/write rate on the optical information storage medium stored as velocity information in a predetermined area on the optical information storage medium, the storage medium is inspected at a first measuring rate in a first radial range on the optical information storage medium. But the storage medium is inspected at a second measuring rate in a second radial range that is located outside of the first radial range.

In one preferred embodiment, the second measuring rate is less than k times as high as the standard rate, and the first measuring rate is lower than the second measuring rate.

In another preferred embodiment, k is a positive real number that is equal to or greater than six.

Another optical information storage medium according to the present invention is also designed to read and/or write information optically from/on it. If the storage medium is a first type of optical information storage medium on which information about a velocity that is m times (where m is a positive real number) as high as a standard read/write rate on the optical information storage medium is stored as velocity information in a predetermined area on the optical information storage medium, then the first type of optical information storage medium is inspected at a predetermined measuring rate. But if the storage medium is a second type of optical information storage medium on which information about a velocity that is n times (where n is a positive real number that is greater than m) as high as the standard read/write rate on the optical information storage medium is stored in a predetermined area on the optical information storage medium, then the second type of optical information storage medium is inspected with the measuring rates changed according to the radial location on the second type of optical information storage medium.

In one preferred embodiment, one of the measuring rates on the second type of optical information storage medium is higher than the measuring rate on the first type of optical information storage medium. The other measuring rate on the second type of optical information storage medium is equal to or higher than the measuring rate on the first type of optical information storage medium.

In a specific preferred embodiment, m is a positive real number that is equal to or greater than four and/or n is a positive real number that is equal to or greater than six.

A reading method according to the present invention is a method of reading information from an optical information storage medium according to any of the preferred embodiments of the present invention described above. The method includes the steps of: irradiating the optical information storage medium with light; and reading the velocity information from the predetermined area on the storage medium.

According to the present invention, the residual error(s) of a focus error signal and/or a tracking error signal are/is measured with the rotational velocities changed according to the radial location on the optical information storage medium between at least two linear velocities that include a first linear velocity Lv1 and a second linear velocity Lv2 that is higher than the first linear velocity Lv1. By changing the rotational velocities, the linear velocity, and the rotational velocity of the optical information storage medium, can be decreased on an inner area of the storage medium. That is why it is possible to prevent the mechanical factors of the inspecting apparatus itself (such as the vibrations of the inspecting apparatus and the resonance of the actuator) from affecting the residual error(s) of the focus error signal and/or the tracking error signal even in an optical information storage medium from/on which information needs to be read or written at high rates. As a result, the residual errors resulting from the mechanical properties of the given optical information storage medium can be measured precisely.

Thus, the present invention provides an inspecting method that contributes to sorting out an optical information storage medium of quality that ensures a read signal of quality (i.e., with a good SER) and tracking servo stability. The present invention achieves this object by preventing various types of disturbances such as out-of-plane vibrations, eccentricity, defects and variation in thickness distribution from increasing the residual error components of the tracking error signal so much as to affect the servo stability with a tracking servo failure or the actuator's oscillation while a read/write operation is being performed on the optical information storage medium. The present invention also prevents the residual error components of the focus error signal from increasing so much as to cause the envelope of a write signal to have any missing portion due to the residual error and decreasing the SER of the read signal significantly. The present invention can be used particularly effectively to inspect a write-once or rewritable optical disc on which information can be written at as high a linear velocity as 6× rate for BDs (with a channel clock frequency of 396 MHz).

On top of that, according to the present invention, at least one of the highest writable linear velocity and radial location information is written on a predetermined area of the optical information storage medium, thereby making it possible to use the same residual error property inspecting apparatus during the manufacturing process of optical information storage media. As a result, the equipment cost can be minimized, the production yield of the media can be increased, and eventually the manufacturing cost of the optical information storage media can be reduced.

DETAILED DESCRIPTION OF PREFERRED EMBODIMENTS

Hereinafter, preferred embodiments of the present invention will be described as being applied to a BD-R (i.e., write-once Blu-ray Disc, which is one of various types of optical discs) as an exemplary optical information storage medium. However, the present invention is in no way limited to those specific preferred embodiments. Alternatively, an optical information storage medium according to the present invention may also be a BD-RE (i.e., a rewritable Blu-ray Disc) on which information can be rewritten a number of times, a BD-ROM (i.e., a read-only Blu-ray Disc), or an optical disc compliant with any other standard.

Main optical constants and physical formats for Blu-ray Discs are disclosed in "Blu-ray Disc Reader" (published by Ohmsha, Ltd.) and on White Paper at the website of Blu-ray Association (http://www.blu-raydisc.com), for example. Specifically, as for a BD-R, an objective lens for a laser beam with a wavelength of 405 nm (which may fall within the range of 400 nm to 410 nm supposing the tolerance of errors is ±5 nm) and with an NA of 0.85 (which may fall within the range of 0.84 to 0.86 supposing the tolerance of errors is ±0.01) is used. A BD-R has a track pitch of 0.32 μm and has one or two storage layers. A BD-R has a single-sided single-layer or a single-sided dual-layer structure on the laser beam incoming side, and its storage plane or storage layer is located at a depth of 75 μm to 100 μm as measured from the surface of the protective coating of the BD-R. The storage plane is a write-once type. A write signal is supposed to be modulated by 17PP modulation technique. Recording marks are supposed to have the shortest mark length of 0.149 μm (which is the length of a 2 T mark), i.e., a channel bit length T of 74.50 nm. The BD-R has a storage capacity of 25 GB (more exactly, 25.025 GB) if it is a single-sided, single-layer disc but has a storage capacity of 50 GB (more exactly, 50.050 GB) if it is a single-sided, dual-layer disc. The channel clock frequency is supposed to be 66 MHz (i.e., 66.000 Mbit/s) at a standard BD transfer rate (1×), 264 MHz (i.e., 264.000 Mbit/s) at BD 4× transfer rate, 396 MHz (i.e., 396.000 Mbit/s) at BD 6× transfer rate and 528 MHz (i.e., 528.000 Mbit/s) at BD 8× transfer rate. And the standard linear velocity (which will also be referred to herein as "reference linear velocity" or 1×) is supposed to be 4.917 m/sec. The 2×, 4×, 6× and 8× linear velocities are 9.834 m/sec, 19.668 m/sec, 29.502 m/sec, and 39.336 m/sec, respectively. A linear velocity higher than the standard linear velocity is normally a positive integral number of times as high as the standard linear velocity. But the factor does not have an integer but may also be a positive real number. Optionally, a linear velocity that is lower than the standard linear velocity (such as a 0.5× linear velocity) may also be defined.

Figure 1:
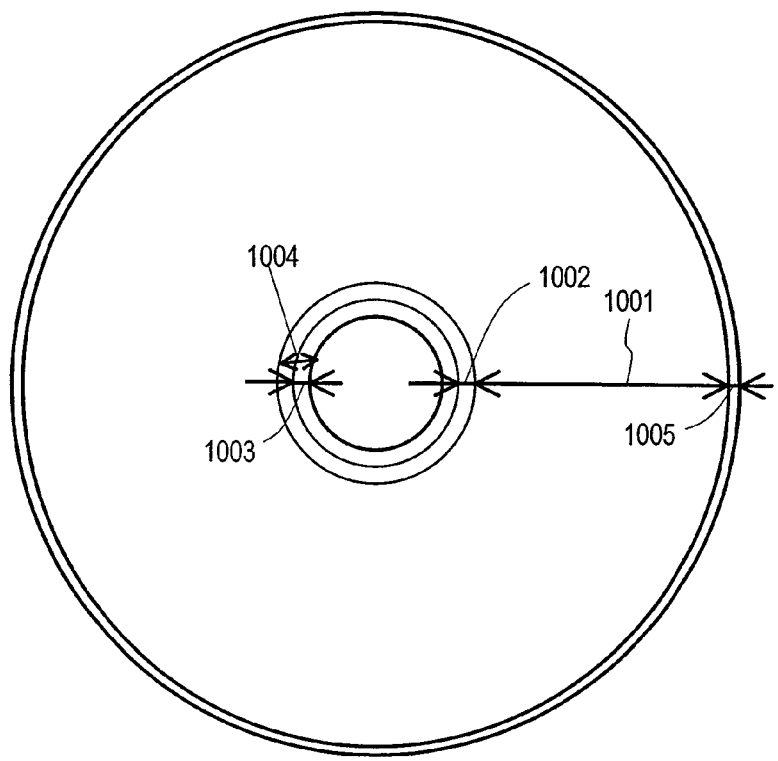
FIG. 1 illustrates a format for an optical information storage medium according to a preferred embodiment of the present invention.

FIG. 1 schematically illustrates a track layout for a BD-R. As shown in FIG. 1, a lead-in zone 1004, a data area 1001 and a lead-out zone 1005 are arranged in this order from the innermost portion of the BD-R outward. An OPC (optimum power control) zone 1002 and a PIC (permanent information and control data) zone 1003 are arranged in the lead-in zone 1004. The OPC zone 1002 is used to find the best recording power and the best write pulse train conditions on a disc-by-disc basis by performing a test write operation before writing data on the data area 1001. Also, if the performance of the given optical disc drive is significantly different from the previous one or if any environmental variation such as a sudden temperature change has arisen, then the OPC zone 1002 is also used to perform a test write operation and cancel the variation in recording power or write pulse train. On the other hand, the PIC zone 1003 is a read-only area, which is formed by modulating the groove with high frequencies and in which parameters to define the disc structure or recommended recording power, the recommended write pulse train width, the write linear velocity, read conditions and other parameters are stored. Although not shown, a so-called "BCA (burst cutting area)", which is a barcode signal representing a unique number for use to identify the medium, is recorded inside the PIC zone 1003 and used as a piece of copyright protection information, for example.

The data area 1001 is an area on which data selected by the user is actually written and is also called a "user area".

The lead-out zone 1005 has no OPC zone or PIC zone but has a so-called "INFO zone" on which management information about the stored data is written. Although not shown, the INFO zone is also provided inside the lead-in zone 1004 on the inner edge. And the same piece of information as the one on the outer edge is also stored on the inner edge to increase the degree of reliability. These zones cover the following ranges: the lead-in zone is defined by radii of 22.2 mm to 24.0 mm; the data area is defined by radii of 24.0 mm to 58.0 mm; and the lead-out zone is defined by radii of 58.0 mm to 58.5 mm as measured from the center of the disc.

Hereinafter, it will be described how to write information on a BD-R. If information is read or written from/on a BD-R at 4× linear velocity by the CLV control technique, the innermost portion of the data area needs to maintain a disc rotational velocity of approximately 8,000 rpm while the outermost portion of the data area needs to maintain a disc rotational velocity of approximately 3,200 rpm to achieve the 4× linear velocity. If a read/write operation needs to be performed at an even higher linear velocity, the rotational velocity of the disc should be further increased.

Figure 2:
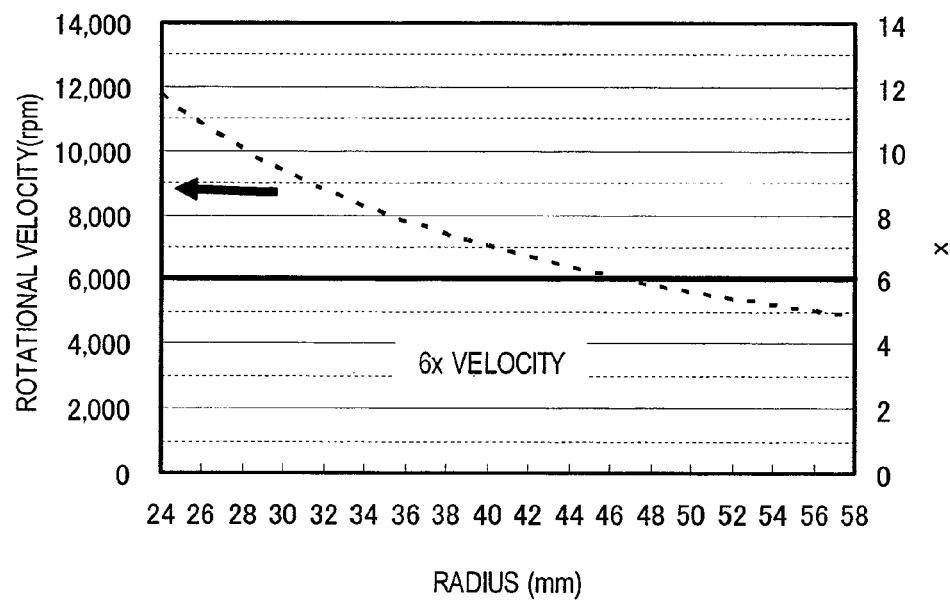
FIG. 2 shows how the rotational velocity changes according to the radial location in a situation where a read/write operation is performed on an optical information storage medium in a 6× CLV mode in a preferred embodiment of the present invention.

FIG. 2 shows the relation between the write location and the rotational velocity in a situation where information needs to be read or written from/on a BD-R at 6× linear velocity. The write location is indicated by the radius r. In that case, the BD-R should be rotated at a rotational velocity of approximately 12,000 rpm in the innermost portion (where r=24 mm) of the data area 1001, and at a rotational frequency of approximately 4,800 rpm in the outermost portion of the data area 1001. As can be seen from FIG. 2, however, if a read/write operation is performed on an inner range where the radius r is approximately 28 mm or less, the rotational velocity of the spindle motor exceeds 10,000 rpm.

As described above, the rotational velocity of the optical disc should not be higher than 10,000 rpm considering the rupture limit of plastic. For that reason, the optical disc should not be inspected at such a high velocity as exceeding 10,000 rpm, either. Also, at such a high velocity, the servo characteristic of the inspecting apparatus might lose its stability and the optical disc could not be inspected accurately. That is why according to the present invention, the optical disc is supposed to be inspected with a proper limit imposed on the highest rotational velocity.

Figure 3:
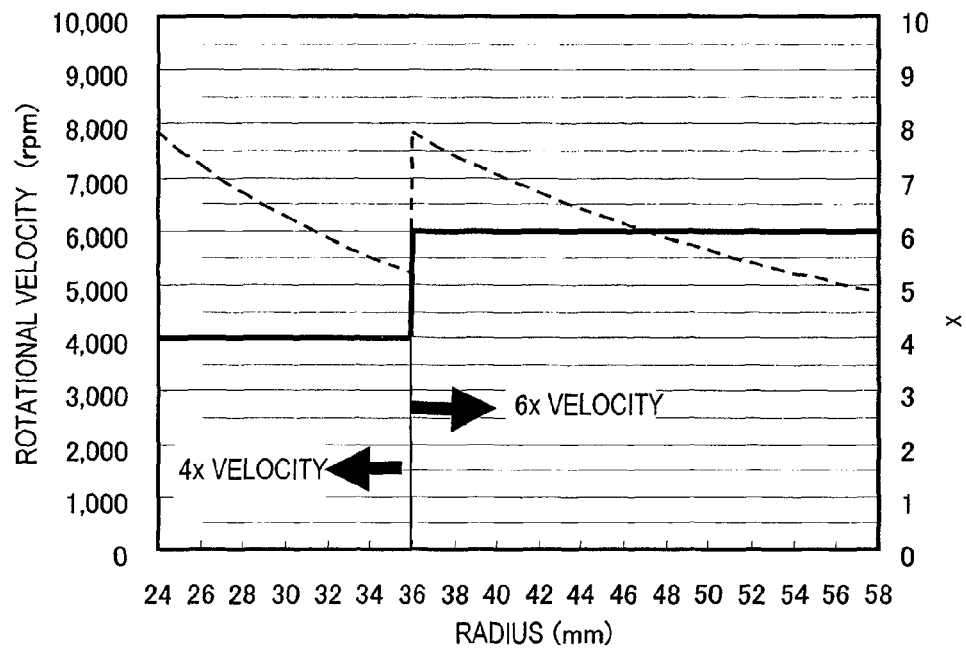
FIG. 3 shows how the rotational velocity changes according to the radial location in a situation where a read/write operation is performed on an optical information storage medium in 4× CLV mode and then in 6× CLV mode in a preferred embodiment of the present invention.

Specifically, the linear velocity on the inner portion of the disc is set to be lower than on the outer portion thereof so that the highest rotational velocity defined is not exceeded. FIG. 3 shows the relations between the radial location and the rotational velocity of the optical disc in a situation where a read/write operation is performed by the CLV control technique at 4× linear velocity on an inner area defined by radial locations r of approximately 36 mm or less and at 6× linear velocity on the remaining area that is located outside of the inner area. In that case, the highest rotational velocity at 4× linear velocity in the innermost portion (where r=24 mm) of the data area 1001 is approximately 8,000 rpm. That is why if the highest rotational velocity over the entire surface of the optical disc is set to be this value, then the rotational velocity will be approximately 8,000 rpm at a radial location r of approximately 36 mm when the linear velocity is 6×. Therefore, by performing a read/write operation at the 4× linear velocity inside of the radial location r of 36 mm but at the 6× linear velocity at or outside of the radial location r of 36 mm, the rotational velocity of the optical disc can always be kept equal or lower than approximately 8,000 rpm.

In this manner, by switching the two linear velocities at the radial location of 36 mm, which is 1.5 times (that is the ratio of the 6× linear velocity to the 4× linear velocity) as distant from the center as the innermost radial location of 24 mm, the highest rotational velocities can always be equal to each other, no matter whether the disc is rotated at the 4× linear velocity or at the 6× linear velocity. By performing a read/write operation with the upper limit set to the highest rotational velocity and with the linear velocities changed according to the radial location, even if the linear velocities are different but if the mutually different linear velocities have the same highest rotational velocity, then there is no need to modify the low-frequency gain characteristic of a servo filter (reference servo) among various servo characteristics such as tracking and focus servo controls according to the highest rotational velocity of each linear velocity in order to catch up with the variation in eccentricity or out-of-plane vibrations of the disc. Then the servo filter of the optical disc drive may have the same characteristic, no matter whether the linear velocity is 4× or 6×.

On top of that, the servo filter of an apparatus for inspecting an optical disc for residual errors (to be described later) can also maintain the same characteristic. That is to say, there is no longer any need to suspend the tracking or focus control operation, modify the settings of the servo filter (reference servo) and then resume the tracking or focus control operation and read operation again in order to switch or change the servo filters according to the linear velocity. As a result, the inspection can get done in a shorter time.

Added to that, when the residual errors are measured at multiple different linear velocities, the entire storage area of the disc can be inspected continuously (i.e., from the innermost portion through the outermost portion thereof) for residual errors just by changing the measuring rotational velocities and the cutoff frequencies of the residual error measuring filter (to be described later). Consequently, the inspection can get done in a much shorter time. As a result, the tact time can be shortened and the productivity of optical discs can be increased. Furthermore, the residual error measuring and inspection processes can be carried out under the same reference servo conditions as an inspecting apparatus for 4× BD-R discs. That is to say, a residual error inspecting apparatus for 4× BD-R discs can be used as it is to inspect a 6× BD-R, too. By combining the respective lines together in this manner, there is no need to introduce a new inspecting apparatus, thus cutting down the equipment cost significantly. As a result, a huge number of media can be mass-produced at a much lower cost.

In the example described above, the radial location r to switch the linear velocities is supposed to be 36 mm. However, this is just an example in a situation where the ratio of the linear velocities is 1.5. Alternatively, if the innermost radial location of 22.2 mm in the lead-in zone is supposed to be a reference radial location and if the highest rotational velocity at that radial location is regarded as the upper limit of the rotational velocity (which is approximately equal to 8,000 rpm), then the 4× and 6× linear velocities may be switched one after the other at a radial location of 33.3 mm. Still alternatively, the innermost radial location of 22.7 mm in the OPC zone on Layer 1 of a dual-layer disc may also be defined as a reference radial location. That is to say, it is appropriate to set the radial location to switch the linear velocities within the range of approximately 33 mm to approximately 36 mm.

Alternatively, if 4× linear velocity and 8× linear velocity are adopted, then the ratio Lv2/Lv1 of linear velocities is 2.0. In that case, if the rotational velocity at the radial location of 22.2 mm to 24 mm is supposed to be the upper limit of the rotational velocity as in 6× even when a read/write operation needs to be performed at the lower linear velocity (i.e., 4× linear velocity), then it is appropriate to set the switching radial location within the range of approximately 44 mm to approximately 48 mm.

Figure 4:
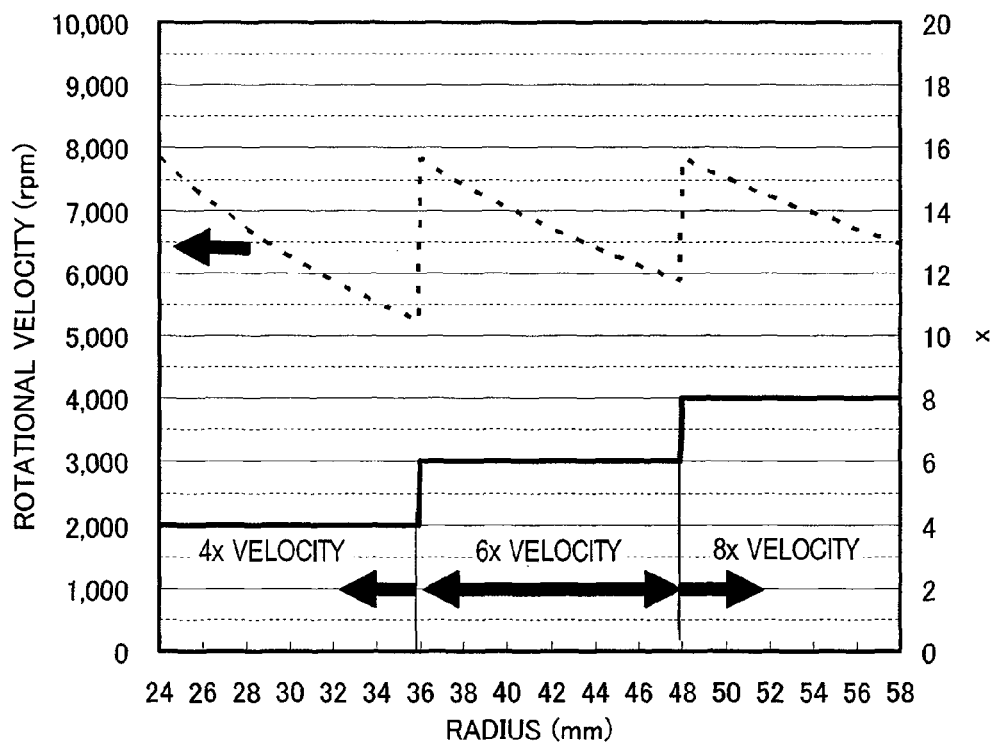
FIG. 4 shows the relations between the radial location and the rotational velocity in a situation where a read/write operation is performed on an optical information storage medium by the CLV control technique with the linear velocities changed between 4×, 6× and 8× according to the radial location in a preferred embodiment of the present invention.

Optionally, a read/write operation may also be performed on a single optical disc at three or more linear velocities. In that case, the number of radial locations to switch the linear velocities becomes smaller than that of linear velocities to use by one. For example, to perform a read/write operation at 4×, 6× and 8× linear velocities, two radial locations to switch the linear velocities need to be defined. FIG. 4 shows the relations between the radial location and the rotational velocity in a situation where a read/write operation is performed by the CLV control technique with the linear velocities changed between 4×, 6× and 8×. The upper limit of the rotational velocities for the respective linear velocities is defined by the rotational velocity at the innermost reference radial location for the 4× linear velocity. The ratios of the 6× and 8× linear velocities with respect to the reference linear velocity of 4× become 1.5 and 2.0, respectively. That is why if a first radial location, which defines a reference radial location of the innermost area of the disc for the 4× linear velocity, is set within the range of 22.2 mm to 24 mm, the second and third switching radial locations may be set within the range of approximately 33-36 mm and within the range of approximately 44-48 mm. Then, a read/write operation may be performed at 4× linear velocity inside of the first radial location, at 6× linear velocity between the first and second radial locations, and at 8× linear velocity outside of the second radial location. In that case, the highest rotational velocity will always be approximately 8,000 rpm, which is the rotational velocity at the first radial location that defines the reference radial location in the innermost area for the 4× linear velocity, no matter which of these three linear velocities is used.

Then, compared to a situation where the linear velocities are switched between 4× and 8×, a read/write operation can be performed at 6× linear velocity, not 4× linear velocity, between the first and second switching radial locations. As a result, the read/write rate on the overall optical disc can be increased and the read/write time can be shortened.

Hereinafter, a preferred embodiment of an optical information storage medium inspecting apparatus according to the present invention will be described. The optical information storage medium inspecting apparatus of the preferred embodiment to be described below measures the residual tracking error of a tracking error signal generated and the residual focus error of a focus error signal generated while rotating the optical disc to inspect at multiple different linear velocities described above and performing a focus control and a tracking control on it with respect to the laser beam emitted from an optical pickup. And then the apparatus compares those residual error values obtained to reference values, thereby determining the given optical disc to be a GO or a NO-GO.

Figure 5:
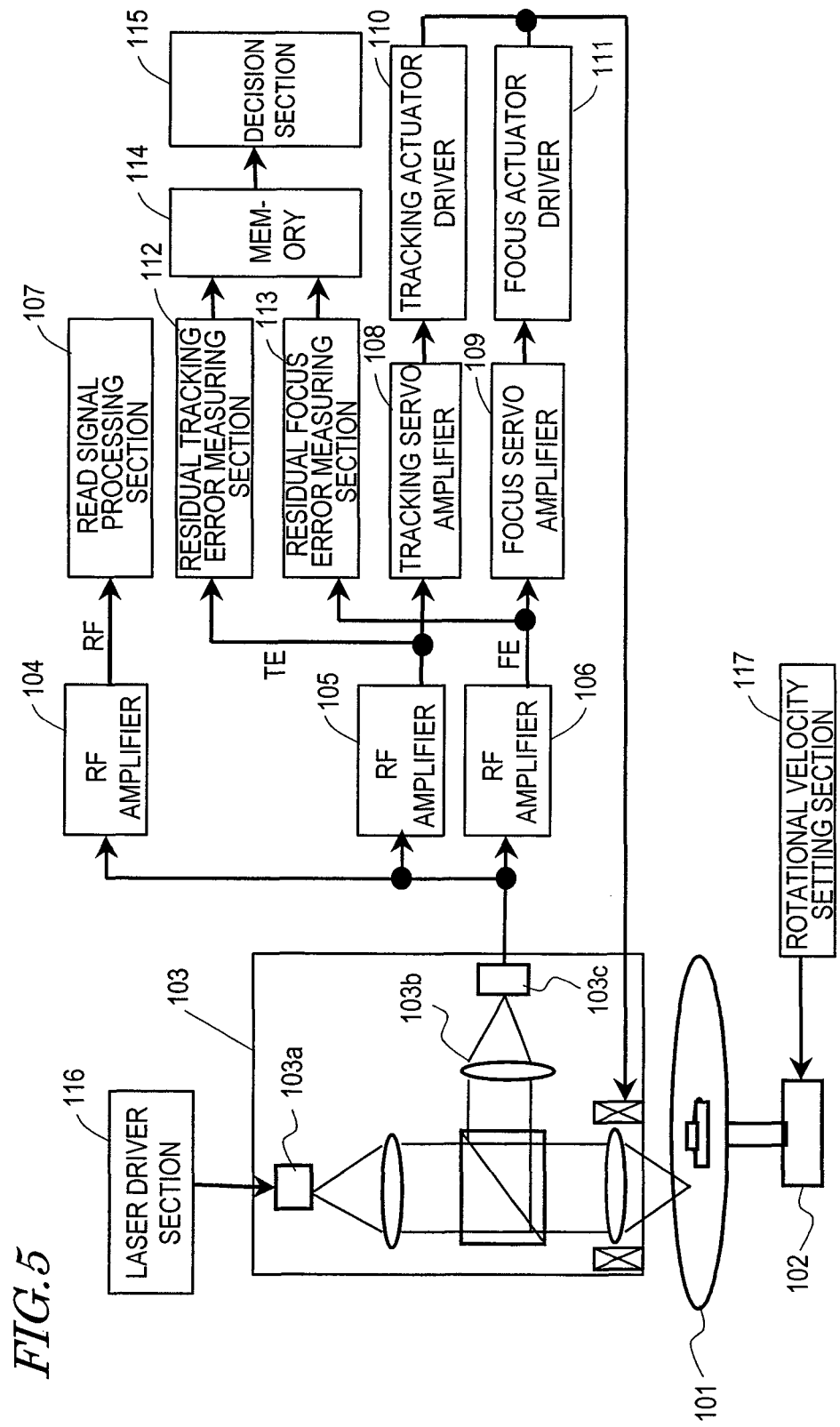
FIG. 5 illustrates an exemplary overall configuration for an optical information storage medium inspecting apparatus according to a preferred embodiment of the present invention.

FIG. 5 is a block diagram illustrating an overall configuration for an optical information storage medium inspecting apparatus as a preferred embodiment of the present invention. The inspecting apparatus shown in FIG. 5 is designed to inspect an optical disc 101 such as a BD-R, which may have the structure that has already been described with reference to FIG. 1.

The inspecting apparatus shown in FIG. 5 includes a spindle motor 102, an optical pickup 103, a laser driver section 116, a rotational velocity setting section 117 and RF amplifiers 104, 105 and 106.

The optical disc 101 is rotated and driven by the spindle motor 102, of which the rotational velocity is controlled by the rotational velocity setting section 117. The laser driver section 116 drives a semiconductor laser 103a in the optical pickup 103, thereby irradiating the optical disc 101 with a laser beam with readout power. The light reflected from the optical disc 101 is transmitted through a detector lens 103a and then received at, and converted into an electrical signal by, a photodetector 103c. Then, the electrical signal is supplied to the RF amplifiers 104, 105 and 106.

The inspecting apparatus further includes a read signal processing section 107, a tracking servo amplifier 108 and a focus servo amplifier 109. The RF amplifier 104 amplifies the output of the optical pickup 103 and then passes an RF signal to the read signal processing section 107. Meanwhile, the RF amplifiers 105 and 106 respectively generate a tracking error (TE) signal and a focus error (FE) signal based on the output of the optical pickup 103, and then supply them to the tracking servo amplifier 108 and the focus servo amplifier 109, respectively.

The inspecting apparatus further includes a tracking actuator driver 110 and a focus actuator driver 111. The tracking servo amplifier 108 generates a control signal based on the tracking error signal and outputs it to the tracking actuator driver 110, while the focus servo amplifier 109 generates a control signal based on the focus error signal and outputs it to the focus actuator driver 111. The tracking and focus actuator drivers 110 and 111 generate drive signals based on the control signals and use those signals to drive the drive coils in the tracking and focus directions in the optical pickup 103. As a result, a tracking servo control loop that uses the tracking error signal is formed by the optical pickup 103, the RF amplifier 105, the tracking servo amplifier 108 and the tracking actuator driver 110. Likewise, a focus servo control loop that uses the focus error signal is formed by the optical pickup 103, the RF amplifier 106, the focus servo amplifier 109 and the focus actuator driver 111.

Figure 6:
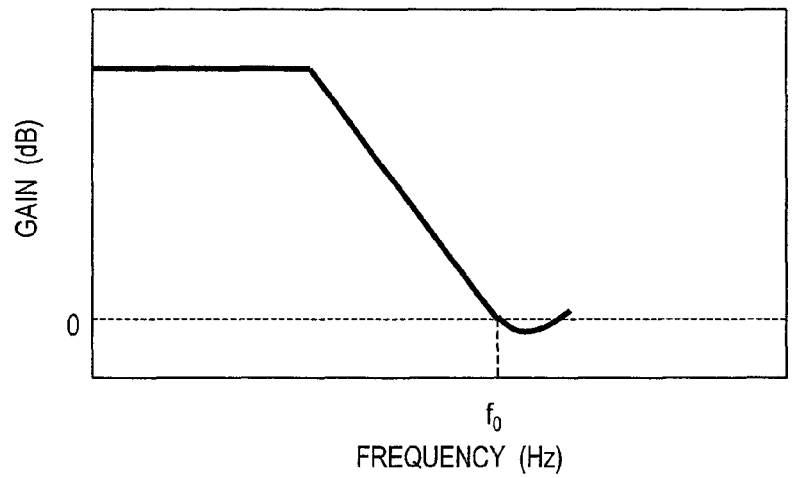
FIG. 6 schematically shows the servo gain characteristic of the inspecting apparatus shown in FIG. 5.

FIG. 6 schematically shows the gain characteristic of servo filters for use to perform the tracking and focus servo controls. The gain characteristic of the servo filters is also called a "reference servo characteristic". The tracking and focus servo controls have a predetermined reference servo characteristic. As shown in FIG. 6, the servo characteristic has a predetermined gain level at low frequencies but comes to have a decreased gain as the frequency increases. And the frequency f0 at which the gain goes zero decibels is called a "gain crossover frequency". The servo characteristic is characterized mainly by this gain crossover frequency. The servo characteristics of the tracking and focus servo controls are different from each other. However, even if the linear velocities are changed while the given optical disc is being inspected, the tracking and focus servo controls are still carried out with the same servo characteristic.

The inspecting apparatus further includes a residual tracking error measuring section 112, a residual focus error measuring section 113, a memory 114 and a decision section 115. Part of the tracking error signal supplied from the RF amplifier 105 is branched from the tracking error signal control loop and then passed to the residual tracking error measuring section 112. As will be described in detail later, the residual tracking error measuring section 112 extracts a residual tracking error from the tracking signal that has been obtained by performing the tracking servo control and outputs it to the memory 114. In the same way, part of the focus error signal supplied from the RF amplifier 106 is branched from the focus error signal control loop and then passed to the residual focus error measuring section 113. The residual focus error measuring section 113 extracts a residual focus error from the focus error signal that has been obtained by performing the focus servo control and outputs it to the memory 114. These residual tracking and focus errors are measured at each radial location on the optical disc.

Then, the decision section 115 compares the residual tracking and focus error values that are now retained in the memory 114 to the predefined reference values of the residual tracking and focus errors, thereby determining whether the disc in question is a GO or a NO-GO. For example, if both of the residual tracking and focus errors at each radial location are equal to or smaller than their reference values, the decision section 115 finds the optical disc inspected a GO.

Figure 7:
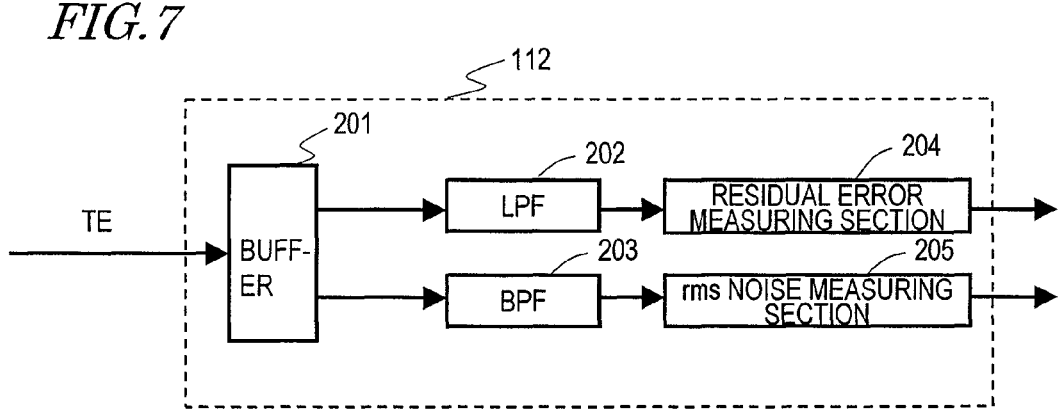
FIG. 7 is a block diagram illustrating a residual tracking error measuring section of the inspecting apparatus shown in FIG. 5.
Figure 8:
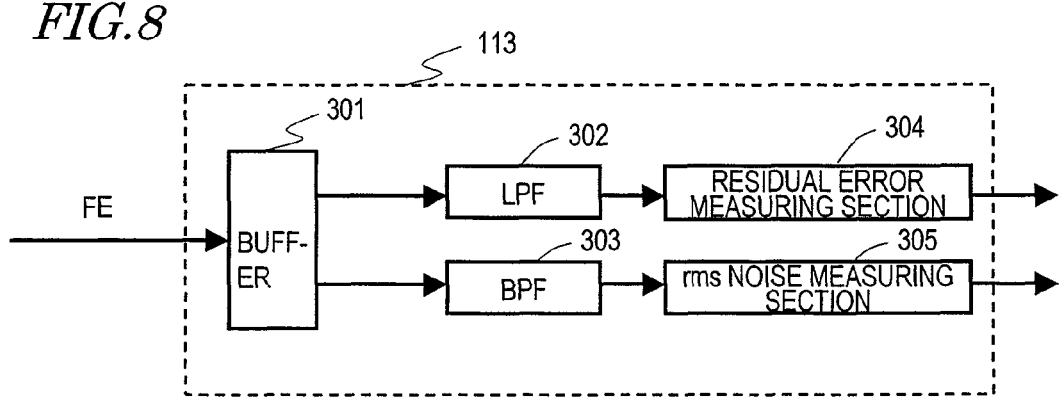
FIG. 8 is a block diagram illustrating a residual focus error measuring section of the inspecting apparatus shown in FIG. 5.

FIGS. 7 and 8 illustrate configurations for the residual tracking error measuring section 112 and the residual focus error measuring section 113, respectively. The residual tracking error measuring section 112 includes a buffer 201, an LPF (low-pass filter) 202, a BPF (band-pass filter) 203, a residual error measuring section 204 and an rms noise measuring section 205. The LPF 202 and the BPF 203 are measuring filters for use to measure the residual error.

The tracking error (TE) signal that has been input to the buffer 201 is branched into two signal components that are supplied to the LPF 202 and the BPF 203, respectively. The residual error measuring section 204 measures the residual tracking error of the tracking error signal that has passed through the LPF 202. Meanwhile, the rms noise measuring section 205 measures the rms noise of the tracking error signal that has passed through the BPF 203.

Figure 9:
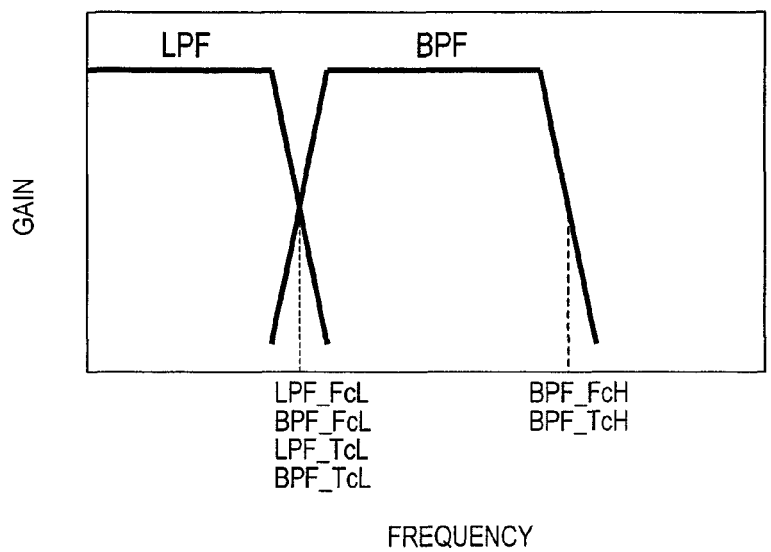
FIG. 9 shows the characteristics of measuring filters for use in the residual tracking and focus error measuring sections shown in FIGS. 6 and 7.

FIG. 9 schematically shows the respective frequency characteristics of the LPF 202 and the BPF 203. The LPF 202 of the residual tracking error measuring section 112 has a cutoff frequency LPF_TcL and the BPF 203 of the residual tracking error measuring section 112 has a lower cutoff frequency BPF_TcL and a higher cutoff frequency BPF_TcH. The cutoff frequency LPF_TcL of the LPF 202 is equal to the lower cutoff frequency BPF_TcL of the BPF 203. These cutoff frequencies may be changed according to the residual error measuring conditions. The LPF 202 is a Butterworth filter with a gradient of −60 dB/dec, while the BPF 203 is also a Butterworth filter with a gradient of +60 dB/dec on the lower frequency side and a gradient of −60 dB/dec on the higher frequency side.

The residual error measuring section 204 detects in real time a residual tracking error included in the tracking error signal that has passed through the LPF 202 while the optical disc 101 is being inspected. Meanwhile, the rms noise measuring section 205 detects rms noise included in the tracking error signal that has passed through the BPF 203 as an effective noise component of the tracking error signal that has been obtained in a period of time corresponding to one turn of the optical disc.

The residual focus error measuring section 113 has the same configuration as the residual tracking error measuring section 112. Specifically, the residual focus error measuring section 113 also includes a buffer 301, an LPF 302, a BPF 303, a residual error measuring section 304 and an rms noise measuring section 305 as shown in FIG. 8. The LPF 302 and the BPF 303 are measuring filters for use to measure the residual error.

The focus error (FE) signal that has been input to the buffer 301 is branched into two signal components that are supplied to the LPF 302 and the BPF 303, respectively. The residual error measuring section 304 measures the residual focus error of the focus error signal that has passed through the LPF 302. Meanwhile, the rms noise measuring section 305 measures the rms noise of the focus error signal that has passed through the BPF 303.

The LPF 302 and the BPF 303 have the same frequency characteristics as the LPF 202 and the BPF 203, respectively. As shown in FIG. 9, the LPF 302 of the residual focus error measuring section 113 has a cutoff frequency LPF_FcL and the BPF 303 of the residual focus error measuring section 113 has a lower cutoff frequency BPF_FcL and a higher cutoff frequency BPF_FcH. The cutoff frequency LPF_FcL of the LPF 302 is equal to the lower cutoff frequency BPF_FcL of the BPF 303. These cutoff frequencies may be changed according to the residual error measuring conditions. The LPF 302 is a Butterworth filter with a gradient of −60 dB/dec, while the BPF 303 is also a Butterworth filter with a gradient of +60 dB/dec on the lower frequency side and a gradient of −60 dB/dec on the higher frequency side.

The frequency characteristics of the LPF 202 and BPF 203 of the residual tracking error measuring section 112 and those of the LPF 302 and BPF 303 of the residual focus error measuring section 113 have been described with reference to the same drawing of FIG. 9 for the sake of convenience. However, the cutoff frequencies LPF_TcL and LPF_FcL of the LPFs 202 and 302 may be different from each other. Likewise, the lower cutoff frequencies BPF_TcL and BPF_FcL of the BPFs 203 and 303 may be different from each other, and the higher cutoff frequencies BPF_TcH and BPF_FcH thereof may also be different from each other.

The residual error measuring section 304 detects in real time a residual tracking error included in the focus error signal that has passed through the LPF 302 while the optical disc 101 is being inspected. Meanwhile, the rms noise measuring section 305 detects rms noise included in the tracking error signal that has passed through the BPF 303 as an effective noise component of the focus error signal that has been obtained in a period of time corresponding to one turn of the optical disc.

Hereinafter, the cutoff frequencies of the LPFs 202, 302 and BPFs 203, 303, which are used as measuring filters, and their residual error measuring conditions and procedures will be described.

The following Table 1 shows exemplary residual focus error measuring conditions and reference values for a 4× BD-R disc and a 6× BD-R disc. On the other hand, the following Table 2 shows exemplary residual tracking error measuring conditions and reference values for those two types of discs. In the following description, the 4×, 6× and other linear velocities will sometimes be simply referred to herein as 4×, 6× and so on.

Also, in the following description, the measuring conditions, reference values, and measuring method of the residual focus error and those of the residual tracking error will be described separately from each other to help the reader get an idea of the present invention more easily. However, these two types of errors may be measured at the same time. Or one of the two types of errors may be measured first, and then the other type of error may be measured. Also, the inspecting method of this preferred embodiment may be carried out by measuring either one or both of the residual focus and tracking errors.

TABLE 1

| Type of disc | 4× disc | 6× disc | |
|---|---|---|---|
| Highest write rate (maximum recording speed) | 4× | 4× | 6× |
| Radial range of measurement (radius) | Every radial location | r < 36 mm | r ≧ 36 mm |
| Measuring rate (measurement speed of servo) | 2× | 2× | 3× |
| Measuring filter (BPF_FcH) | 20 kHz | 20 kHz | 30 kHz |
| Measuring filter (LPF_FcL and BPF_FcL) | 3.2 kHz | 3.2 kHz | 4.8 kHz |
| Gain crossover frequency of servo characteristic (crossover frequency) | 3.2 kHz | 3.2 kHz | 3.2 kHz |
| Reference value (BPF) | 32 nm | 32 nm | 32 nm |
| Reference value (LPF) | 80 nm | 80 nm | 110 nm |

TABLE 2

| Type of disc | 4× disc | 6× disc | |
|---|---|---|---|
| Highest write rate (maximum recording speed) | 4× | 4× | 6× |
| Radial range of measurement (radius) | Every radial location | r < 36 mm | r ≧ 36 mm |
| Measuring rate (measurement speed of servo) | 2× | 2× | 3× |
| Measuring filter (BPF_TcH) | 20 kHz | 20 kHz | 30 kHz |
| Measuring filter (LPF_TcL and BPF_TcL) | 3.6 kHz | 3.6 kHz | 3.6 kHz |
| Gain crossover frequency of servo characteristic (crossover frequency) | 3.6 kHz | 3.6 kHz | 3.6 kHz |
| Reference value (BPF) | 9.2 nm | 9.2 nm | 9.2 nm |
| Reference value (LPF) | 20 nm | 20 nm | 20 nm |

First of all, the measuring conditions, reference values and measuring method of the residual focus error will be described.

In Table 1, the "highest write rate" refers to the highest possible rate of writing information on a given optical disc. In this case, a "4× disc" means a disc on which information can be written at most at 4× linear velocity that is four times as high as the standard linear velocity (1×). That is to say, the 4× linear velocity represents the highest write rate. On the other hand, in a 6× disc, information can be written at 4× linear velocity that is four times as high as the standard linear velocity (1×) on the inner area but at 6× linear velocity on the outer area as described above. Thus, the 6× linear velocity represents the highest write rate in this case. That is why as for the 4× disc, the measurements are carried out under the same set of conditions over the entire area of the disc (i.e., from the innermost portion through the outermost portion thereof). On the other hand, as for a 6× disc, the measurements are carried out under two different sets of conditions, which are switched at a radial location r of 36 mm.

The linear velocity on the inner area will be referred to herein as a "first linear velocity Lv1", while the linear velocity on the outer area a "second linear velocity Lv2". Both of the first and second linear velocities Lv1 and Lv2 are a positive real number of times as high as a standard linear velocity of 4.917 m/sec and the second linear velocity Lv2 is higher than the first linear velocity Lv1.

Information about these linear velocities that enable a read/write operation on an optical disc is stored in advance in a predetermined area of the optical disc (e.g., in a disc management area in the PIC zone 1003 shown in FIG. 1).

The residual focus error is measured at a linear velocity that is a half as high as the highest write rate. In that case, to estimate the residual focus error to be caused when the user actually reads or writes information from/on a BD-R disc, the gain crossover frequency of the servo filter for use in inspection and the cutoff frequencies of the measuring filters (i.e., LPF and BPF) are defined to be a half as high as the actual frequencies for reading and writing proportionally to the linear velocity.

Figure 10A:
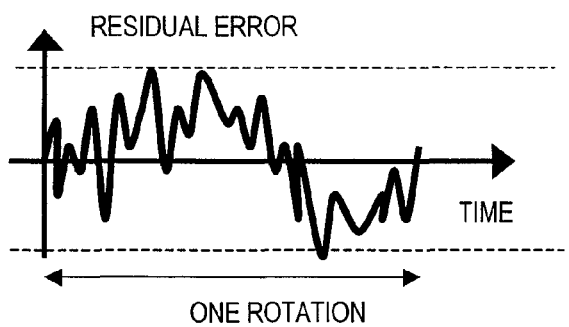
FIG. 10A shows the residual focus errors that were measured when the disc was rotated at 4× linear velocity.
Figure 10B:
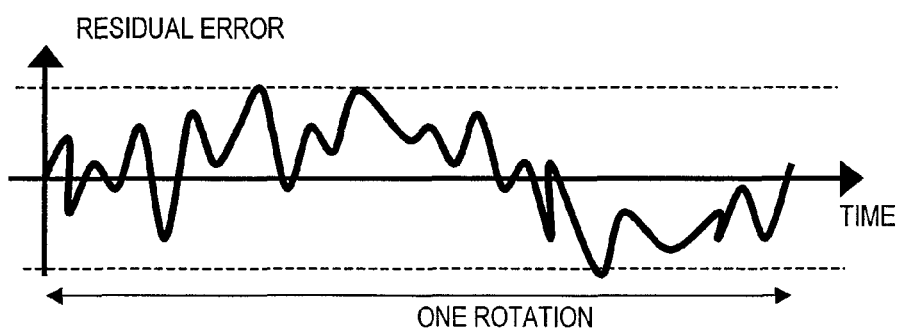
FIG. 10B shows the residual focus errors that were measured when the disc was rotated at 2× linear velocity.

FIGS. 10A and 10B show the residual focus errors to be caused when a read/write operation is performed on the same track on the same optical disc at 4× linear velocity and at 2× linear velocity, respectively.

In this case, the servo filter that was used for measurements has gain crossover frequencies of 6.4 kHz and 3.2 kHz, respectively. Also, while the residual errors were measured, the LPF had cutoff frequencies of 3.2 kHz and 1.6 kHz. Thus, comparing these two signals, it can be seen easily that residual error values with the same amplitude can be obtained by reducing the cutoff frequency to a half proportionally to the ratio of the linear velocities.

Thus, in a situation where the servo characteristic is measured at a linear velocity that is a half as high as the highest write rate during an actual write operation (i.e., a linear velocity at which user data is actually written), even if the measurements are done at two different linear velocities, residual error values with the same amplitude can still be obtained by cutting down the gain crossover frequency of the servo filter and the cutoff frequencies of the measuring filters to a half proportionally to the ratio of the linear velocities.

If the disc were revolved at as high a rotational velocity as more than 5,000 rpm, then the mechanical vibrations of the spindle motor and the resonance of the actuator of the optical pickup would raise a serious problem. That is to say, if the disc were revolving at such high velocities, the influence of mechanical residual error components, produced by members of the inspecting apparatus such as a spindle motor and an actuator, would be quite a little to make it difficult to accurately measure the target residual error components of the optical disc itself. However, if the residual focus error is measured with the rotational velocity decreased to a half as high as the linear velocity during an actual read/write operation and with the gain crossover frequency of the servo filter and the cutoff frequencies of the measuring filters also reduced to a half proportionally to the ratio of linear velocities, then the mechanical residual error components produced by the vibrations or resonance of the inspecting apparatus itself can be reduced. As a result, the target residual error components of the optical disc itself can be measured accurately.

As shown in Table 1, in the 6× disc, inside of the radial location of 36 mm, the highest write rate is 4×. That is why the measurements can be made on the same measuring condition as the 4× disc. That is to say, inside of the radial location of 36 mm on the 6× disc, the residual focus error can be measured under the same conditions as a conventional 4× disc inspecting apparatus.

On the other hand, at and outside of the radial location of 36 mm, the highest write rate is 6×. Also, the ratio of the 6× linear velocity to the 4× linear velocity is 1.5. That is why the 6× disc could be inspected with the gain crossover frequency of the servo filter and the cutoff frequencies of the measuring filters (LPF and BPF) increased by the factor of 1.5 compared to the values for use in doing measurements on the 4× disc. However, if the gain crossover frequency of the servo filter were multiplied by the factor of 1.5 and increased to 4.8 kHz, it would be equivalent to a situation where an optical disc drive actually used by the user is performing a read/write operation at 6× linear velocity with a focus servo control performed at a gain crossover frequency of 9.6 kHz.

In a small-sized optical disc drive such as a normal half-height optical disc drive, the gain crossover frequency needs to be 6 to 8 kHz, where a certain degree of phase margin can be ensured, in order to prevent the actuator from oscillating and to perform the servo control with good stability. That is to say, at the half rotational frequency, a gain crossover frequency of 3.2 kHz is virtually the limit that can be achieved by the optical disc drive. For that reason, according to this inspecting method, in measuring the residual focus error on the outer area of a 6× disc (i.e., at or outside of the radial location of 36 mm), the gain crossover frequency of the servo filter is defined to be 3.2 kHz, which is equal to that of a 4× disc inspecting apparatus.

On the other hand, the cutoff frequencies of the measuring filters LPF and BPF are changed by the ratio of the highest linear velocity of a 6× disc to that of a 4× disc. Hereinafter, it will be described why this change needs to be made. When it comes to a residual focus error, a decrease in the SER (symbol error rate) of an RF signal should be taken into account. That is to say, a reference value needs to be provided for the residual focus error in order to prevent the RF signal from losing a portion of its envelope after writing. Specifically, once the allowable defocus margin of a disc is exceeded during a write operation while there is a significant residual focus error, the laser beam spot on the storage layer of the optical disc will be widened by defocusing too much to converge the laser beam with sufficient energy density. As a result, marks will be left with a substantial lack of recording power. That is to say, marks will be left on the storage layer of the optical disc with their widths varied in the radial direction according to the magnitude of the residual error.

Figure 11:
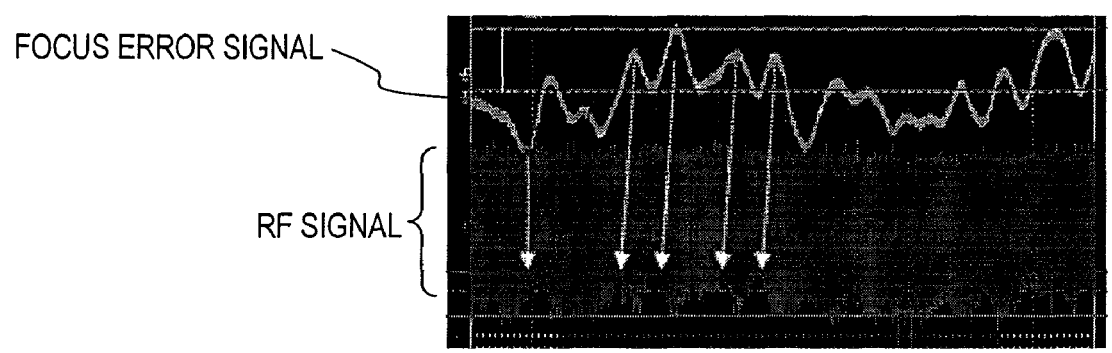
FIG. 11 shows what relation the RF signal waveform and the residual focus error will have in a situation where a write operation is performed while there is a significant residual focus error.

FIG. 11 shows what relation the read signal (RF signal) waveform and the focus error signal will have in a situation where information is written on an optical disc with a significant residual focus error and then the information written is read. In that case, the focus error signal has passed through the measuring filters, and therefore, the amplitude represents the residual focus error. As can be seen from FIG. 11, where there is a significant residual focus error, the RF signal loses a portion of its envelope closer to the mark (which will be referred to herein as the "lower envelope"). Such a residual focus error is produced due to a variation in the thickness of the coating layer over the disc surface. The residual focus error is measured by rotating the optical disc and by monitoring the level of the signal generated based on the reflected light. That is why the spatial distribution of the thickness of the coating layer that covers the storage layer is monitored after having been converted into a distribution of linear velocities of the scanning laser beam on the time axis. That is to say, the frequency components of the residual focus error caused by the variation in the thickness of the coating layer are proportional to the rotational linear velocities. For example, if the linear velocity is increased from 2× to 3×, the residual focus error that is monitored at the 2× linear velocity due to a variation in the thickness of the coating layer over the disc surface scanned with the laser beam will have its frequencies shifted to a frequency range that is 1.5 times (i.e., the ratio of these two linear velocities) as high as the previous range. In this case, if the frequencies of the servo filter and the measuring filters are changed proportionally to the ratio of the linear velocities, a residual focus error with the same amplitude will be monitored as already described with reference to FIGS. 10A and 10B. However, since the rotational velocity is increased with the gain crossover frequency of the servo filter fixed at 3.2 kHz, the residual focus error component at frequencies of 4-5 kHz in the vicinity of the gain crossover frequency cannot be suppressed at 3× rotational velocity even by performing focus servo controls because those components are outside of the gain crossover frequency, and therefore, are monitored as more significant residual errors. That is to say, unless the residual focus error components in this range can be suppressed, the RF signal will lose a portion of its envelope and the read signal will have a decreased SER, thus causing read errors.

For that reason, if the residual focus error is measured with the cutoff frequencies of the residual focus error measuring filters multiplied by the factor of 1.5 proportionally to the rotational velocity, then every single residual focus error component that would cause the RF signal to lose a portion of its envelope on a 4× disc can be detected.

Meanwhile, the residual focus error component of the BPF is measured to reduce the amount of ineffective current flowing through the actuator, rather than ensuring good read/write signal quality. That is why such a residual focus error component is sometimes called "rms noise component". However, if the optical disc is inspected with the lower and higher cutoff frequencies of the band-pass filter for use to measure the rms noise multiplied by the factor of 1.5 proportionally to the ratio of the linear velocities, every single rms noise component in a frequency range that would raise a problem on a 4× disc can also be detected without fail.

Consequently, if the 6× disc is inspected with the cutoff frequencies of the measuring filters multiplied by the factor of 1.5 while the gain crossover frequency of the servo filter fixed at 3.2 kHz, corresponding to the one to be achieved by a real drive, then discs with significant residual focus errors can be sorted out properly.

What is more, the inspection can get done without changing the characteristics of the servo filter (e.g., the gain crossover frequencies among other things) between a 4× disc and a 6× disc or between the inside and outside of the switching radial location on a 6× disc. As a result, the inspecting apparatus may use the same servo filter for both purposes, which is beneficial in terms of the productivity of optical discs, too. That is to say, a 4× disc inspecting apparatus can be used as it is as a 6× disc inspecting apparatus.

On top of that, there is no longer any need to suspend the tracking or focus control operation, modify the settings of the reference servo, and then resume the tracking or focus control operation and optical disc inspection again in order to switch or change the servo filters according to the linear velocity. Added to that, the entire disc can be inspected continuously for residual errors just by changing the linear velocities. Consequently, the inspection can get done in a much shorter time. As a result, the tact time can be shortened and the productivity of optical discs can be increased. Furthermore, the residual errors can be measured under the same reference servo conditions as an inspecting apparatus for 4× BD-R discs. That is to say, an inspecting apparatus for 4× BD-R discs can be used as it is to inspect a 6× BD-R, too. By combining the respective inspection lines of these two types of optical discs together in this manner, there is no need to introduce a new inspecting apparatus, thus cutting down the equipment cost significantly. As a result, a huge number of optical discs can be mass-produced at a much lower cost, which is tremendously beneficial.

By using an inspecting apparatus for which those measuring conditions have been defined in advance, the entire surface of the optical disc can be inspected for residual focus errors from the innermost edge through the outermost edge thereof. And if the LPF and BPF residual error values are equal to or smaller than reference values, the disc is passed as a GO. But if the residual error values exceed the reference values, the disc is a NO-GO.

Figure 12:
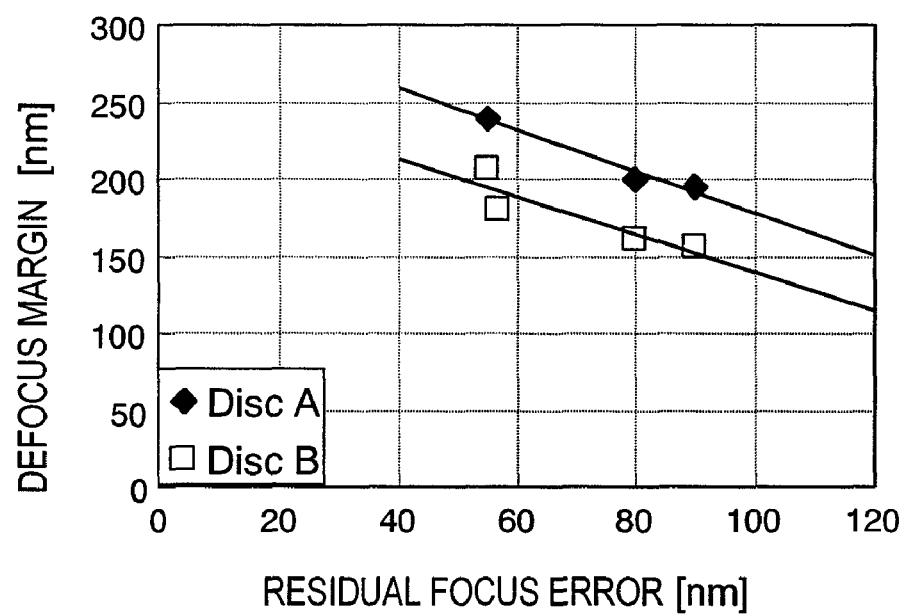
FIG. 12 shows how the probability of tracking failures changes with the residual tracking error according to the frequency of disturbance.

Next, the residual focus error reference value will be described. As described above, even if the linear velocities are changed, the cutoff frequencies of the measuring filters are changed proportionally to the ratio of the linear velocities. That is why on the 6× disc, the residual focus error values have substantially the same tolerable amplitudes both inside of the radial location of 36 mm and at and outside of the radial location of 36 mm. For that reason, the same residual focus error reference values for the BPF and LPF may be used as in inspecting the 4× disc. However, the reference values are preferably determined with the power margin of a laser beam while a write operation is being performed on the optical disc taken into account. FIG. 12 shows the relations between the residual focus errors of two types of discs and their defocus margins. As used herein, the "defocus margin" refers to a focus range in which SER≦4.2E−3. In this example, Discs A and B with mutually different power margins are used. Specifically, Discs A and B have power margins of 23% and 18%, respectively. That is to say, there is a difference of 5% in power margin between Discs A and B.

As used herein, the "power margin" refers to a power range in which the limit equalizer jitter falls within a predetermined range when a write operation is performed with the power decreased or increased from the optimum one. More specifically, the "power margin" refers to a power range in which if the power has been decreased by 10%, a single-layer disc has a jitter of 8.5% or less, L0 layer of a dual-layer disc (i.e., the deeper layer that is more distant from the light incoming side) also has a jitter of 8.5% or less, and L1 layer thereof (i.e., the shallower layer that is closer to the light incoming side) has a jitter of 10.5% or less. Even more specifically, the power margin refers to a power range in which marks except the shortest mark or space have a jitter of 8.5% or less on the L1 layer. For example, according to the 1-7 modulation technique, the mark lengths are limited to the range of 2 T through 8 T, and therefore, the shortest mark length is 2 T. Meanwhile, the "power margin" also refers to a power range in which if the power has been increased by 10%, a single-layer disc has a jitter of 10.5% or less, L0 layer of a dual-layer disc also has a jitter of 10.5% or less, and L1 layer thereof has a jitter of 12.5% or less. Even more specifically, the power margin refers to a power range in which marks except the shortest mark or space have a jitter of 10.5% or less on the L1 layer.

As shown in FIG. 12, even if a residual focus error of the same magnitude has occurred on these two types of discs, the defocus margin of Disc A is always approximately 30-40 nm broader than that of Disc B at any residual focus error value. That is to say, Disc A has a broader power margin than Disc B. That is why Disc A should be less affected by a decrease in recording power due to the residual focus error than Disc B is. As can be seen from the results shown in FIG. 12, if there is a difference of 5% between the power margins, then it may be determined that there is a tolerance of approximately 30-40 nm with respect to the defocus margin.

That is to say, even if the residual focus error reference value were made less strict (e.g., increased from 80 nm to 110-120 nm) according to the power margin, both discs would still have similar system margins. For example, in a situation where the residual focus error has a reference value of 80 nm, if there is a power margin of ±10%, then the reference value may be increased to 110 nm.

In other words, even if the residual focus error tolerance were extended by the magnitude of the defocus margin with respect to such a disc with a relatively broad power margin, the margin tolerated by the overall system would not decrease. That is why as for a disc with a good power margin, if the reference value is made less strict in view of the residual focus error tolerance value, the production yield of media can be increased without decreasing the productivity of the media with an excessively strict residual error reference value. Also, even by designing such a disc with a broad power margin by either optimizing the recording film or reflective film or modifying the write strategy, for example, the residual error tolerance, which will often pose a problem when the read/write rates should be increased, can also be extended and the productivity of optical discs can be increased, which is definitely beneficial.

Specifically, in inspecting a 6× disc with a predetermined power margin, the residual focus error inspection reference value on the outer area at and outside of the radial location of 36 mm, where the linear velocity should be 3×, is defined to be equal to or greater than the one inside of the radial location of 36 mm, where the linear velocity should be 2×. That is to say, the reference value may be extended. As a result, it is possible to prevent the yield of discs from declining due to an excessively strict residual error reference value when the discs are inspected for residual focus errors on the outer area at and outside of the radial location of 36 mm. Consequently, optical discs can be manufactured with the predetermined signal storage quality guaranteed. More specifically, if a 6× disc has a power margin of ±10%, the residual focus error inspection reference value may be 80 nm on the outer area at and outside of the radial location of 36 mm where the linear velocity should be 3× and may be 110 nm inside of the radial location of 36 mm where the linear velocity should be 2× as shown in Table 1.

Next, the residual tracking error measuring conditions, the reference values, and the method of inspecting the disc for residual tracking errors will be described.

In Table 2, the "highest write rate" refers to the highest possible rate of writing information on a given optical disc as in Table 1. In this case, a "4× disc" means a disc on which information can be written at most at 4× linear velocity that is four times as high as the standard linear velocity (1×). On the other hand, in a 6× disc, information can be written at 4× linear velocity that is four times as high as the standard linear velocity (1×) on the inner area but at 6× linear velocity on the outer area as described above. That is why as for the 4× disc, the measurements are carried out under the same set of conditions over the entire area of the disc (i.e., from the innermost portion through the outermost portion thereof). On the other hand, as for a 6× disc, the measurements are carried out under two different sets of conditions, which are switched at a radial location r of 36 mm. The linear velocity on the inner area will be referred to herein as a "first linear velocity Lv1", while the linear velocity on the outer area a "second linear velocity Lv2". Both of the first and second linear velocities Lv1 and Lv2 are an integral number of times as high as a standard linear velocity of 4.917 m/sec and the second linear velocity Lv2 is higher than the first linear velocity Lv1.

The residual tracking error is measured at a linear velocity that is a half as high as the highest write rate. In that case, to estimate the residual tracking error to be caused when the user actually reads or writes information from/on a BD-R disc, the gain crossover frequency of the servo filter for use in inspection and the cutoff frequencies of the measuring filters (i.e., LPF and BPF) are defined to be a half as high as the actual frequencies for reading and writing proportionally to the linear velocity.

In this respect, the same idea as what has already been described about how to determine the gain crossover frequency of the servo filter and the cutoff frequencies of the measuring filters (LPF and BPF) in the residual focus error measuring method is also applicable. That is to say, in a situation where the servo characteristic is measured at a linear velocity that is a half as high as the highest write rate during an actual write operation (i.e., a rate at which user data is actually written), even if the measurements are done at two different linear velocities, residual error values with the same amplitude can still be obtained by cutting down the gain crossover frequency of the servo filter and the cutoff frequencies of the measuring filters to a half proportionally to the ratio of the linear velocities.

If the disc were revolved at as high a rotational velocity as more than 5,000 rpm, then the mechanical vibrations of the spindle motor and the resonance of the actuator of the optical pickup would raise a serious problem. That is to say, if the disc were revolving at such high velocities, the influence of mechanical residual error components, produced by members of the inspecting apparatus such as a spindle motor and an actuator, would be quite a little to make it difficult to accurately measure the target residual error components of the optical disc itself. However, if the residual focus error is measured with the rotational velocity decreased to a half as high as the linear velocity during an actual read/write operation and with the gain crossover frequency of the servo filter and the cutoff frequencies of the measuring filters also reduced to a half proportionally to the ratio of linear velocities, then the mechanical residual error components produced by the vibrations or resonance of the inspecting apparatus itself can be reduced. As a result, the target residual error components of the optical disc itself can be measured accurately.

As shown in Table 2, in the 6× disc, inside of the radial location of 36 mm, the highest write rate is 4×. That is why the measurements can be made on the same measuring condition as the 4× disc. That is to say, inside of the radial location of 36 mm on the 6× disc, the residual tracking error can be measured under the same conditions as a conventional 4× disc inspecting apparatus.

On the other hand, at and outside of the radial location of 36 mm, the highest write rate is 6×. Also, the ratio of the 6× linear velocity to the 4× linear velocity is 1.5. That is why the 6× disc could be inspected with the gain crossover frequency of the servo filter and the cutoff frequencies of the measuring filters (LPF and BPF) increased by the factor of 1.5 compared to the values for use in doing measurements on the 4× disc. However, if the gain crossover frequency of the servo filter were multiplied by the factor of 1.5 and increased to 5.4 kHz, it would be equivalent to a situation where an optical disc drive actually used by the user is performing a read/write operation at 6× linear velocity with a focus servo control performed at a gain crossover frequency of 10.8 kHz.

In a small-sized optical disc drive such as a normal half-height optical disc drive, the gain crossover frequency needs to be 6 to 8 kHz, where a certain degree of phase margin can be ensured, in order to prevent the actuator from oscillating and to perform the servo control with good stability. That is to say, at the half rotational velocity, a gain crossover frequency of 3.6 kHz is virtually the limit that can be achieved by the optical disc drive. For that reason, according to this inspecting method, in measuring the residual focus error on the outer area of a 6× disc (i.e., at or outside of the radial location of 36 mm), the gain crossover frequency of the servo filter is defined to be 3.6 kHz, which is equal to that of a 4× disc inspecting apparatus.

The residual tracking error is caused by a variation in the thickness of the optical disc in the radial direction, non-uniformity of grooves, a defect of the stamper, a scratch left during the forming process, or unevenness of the spin coated layer that forms the protective coating, for example. The residual tracking error is measured by rotating the optical disc and by monitoring the signal generated based on the reflected light. That is why the non-uniform spatial distribution of tracks in the tracking direction is monitored after having been converted into a distribution of rotational linear velocities on the time axis. That is to say, the frequency components of the residual tracking error are proportional to the rotational linear velocities. For example, if the rotational linear velocity is increased from 2× to 3×, the residual tracking error that is monitored at the 2× linear velocity due to some variation in track shape in the radial direction will have its frequencies shifted to a frequency range that is 1.5 times (i.e., the ratio of the two linear velocities) as high as the previous range. In this case, if the frequency ranges of the servo filter and the measuring filters are shifted toward higher frequencies proportionally to the ratio of the linear velocities, a residual tracking error with the same amplitude will be monitored. However, since the rotational velocity is increased with the gain crossover frequency of the servo filter fixed at 3.6 kHz, the residual tracking error component at frequencies of 4-5 kHz in a higher range than the gain crossover frequency cannot be suppressed at 3× rotational velocity even by performing a tracking servo controls because those components are outside of the gain crossover frequency, and therefore, are monitored as more significant residual tracking errors. That is to say, unless the residual tracking error components in this range can be suppressed, the tracking error signal will have outstanding spike noise, thus threatening the stability of tracking control.

In measuring residual focus errors on a 6× disc on the outer area thereof at and outside of the radial location of 36 mm, the cutoff frequencies of the two measuring filters including an LPF and a BPF are supposed to be increased by the factor of 1.5 that is the ratio of the highest velocity of the 6× disc to that of the 4× disc compared to the cutoff frequencies while the 4× disc is being inspected. This is done to prevent the SER from decreasing due to a partial loss of the envelope of an RF signal to be caused by residual focus errors during a write operation.

However, a signal to be written on a BD has such a broad off-track margin that no significant residual tracking error will cause the RF signal to lose any portion of its envelope or cause any decrease in SER. Rather than that, more attention should be paid to the stability of tracking servo in setting residual tracking error measuring conditions. That is to say, the disc has only to be inspected for residual tracking error components at least in such a range in which the stability of the tracking servo is threatened.

In this case, residual tracking errors or disturbance components, of which the frequencies are higher than the gain crossover frequency of 3.6 kHz of the servo filter, are located outside of the tracking servo control range, and never have such frequencies that will affect the stability of the tracking servo control. That is why in setting the cutoff frequency of the LPF to process the tracking error signal, residual tracking errors and disturbances need to be detected just in a frequency range that is lower than the vicinity of the gain crossover frequency of the servo filter.

Consequently, unless the residual tracking error components that are caused by the disc itself in such a frequency range that is lower than the gain crossover frequency are suppressed, the tracking servo could suddenly fail due to some disturbance during a read/write operation. For example, an unintentional track jump could occur during a write operation to write data on a neighboring track accidentally and erase the stored data by mistake. Meanwhile, if optical discs were produced with high mechanical precision by going so far as to shift the frequency range of the measuring filter toward higher frequencies meaninglessly and detect unnecessary residual tracking error components for nothing, the production yield of optical discs would decrease significantly. That is why to avoid such an undue increase in manufacturing cost, it is important to do inspection with an appropriate cutoff frequency defined for the LPF.

For that reason, when the residual tracking errors of a 6× disc are measured on the outer area thereof at and outside of the radial location of 36 mm, the LPF that is one of the residual tracking error measuring filters preferably has a cutoff frequency of 3.6 kHz, which is as high as the gain crossover frequency. That is to say, as far as the cutoff frequency of the LPF is concerned, even when the residual tracking errors of a 6× disc are measured on the outer area thereof at and outside of the radial location of 36 mm, the same condition as the one adopted by a 4× disc inspecting apparatus is preferably used. Then, every single residual tracking error component can be detected to ensure the servo stability. As a result, it is possible to avoid any decrease in the yield of media without threatening the servo stability.

Meanwhile, as for the residual tracking error component of the BPF, a standard is set to reduce the amount of ineffective current flowing through the actuator, rather than ensuring servo stability. That is why such a residual focus error component is sometimes called "rms noise". However, if that rms noise is also measured with the higher cutoff frequency of the BPF for use to measure the rms noise multiplied by the factor of 1.5 proportionally to the ratio of linear velocities, every single rms noise component in a frequency range that would cause a problem on a 4× disc can also be detected without fail.

Figure 13:
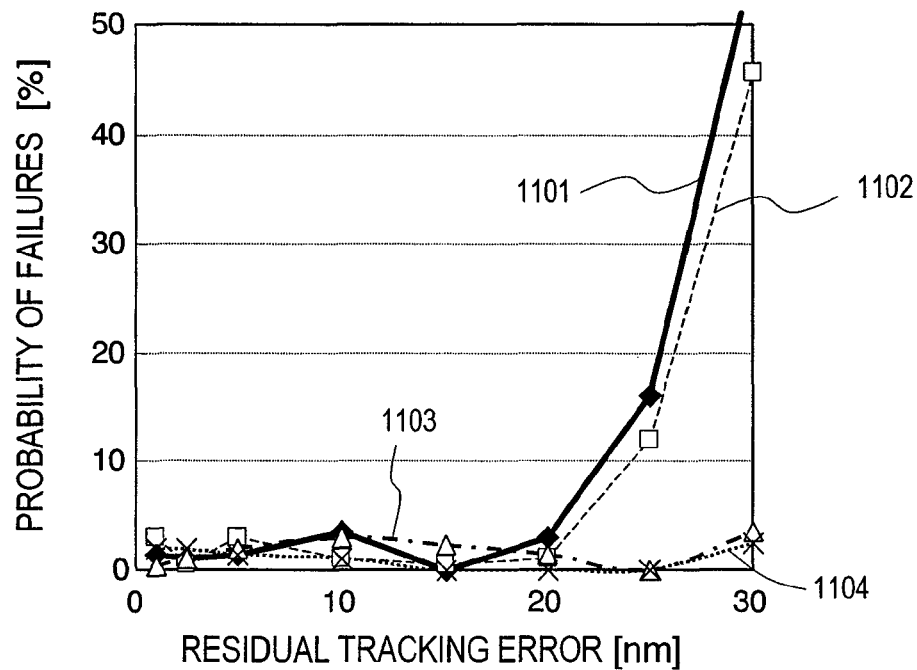
FIG. 13 shows the relations between the residual focus errors and their defocus margins.

FIG. 13 shows how the probability of tracking failures changes with the residual tracking error according to the frequency of disturbance. The results shown in FIG. 13 were obtained in the following manner.

Specifically, with the applied voltages changed into several different values, the magnitudes of residual tracking errors were measured in the tracking ON state at various disturbance frequencies. Next, at each of the disturbance frequencies and each of the applied voltages at which the magnitudes of the tracking errors were measured, attempts were made in the tracking OFF state to establish a tracking servo loop (i.e., to accomplish the tracking ON state). These attempts were made a number of times, and it was counted how many times the tracking servo loop could not be established and tracking failures occurred and how many times the tracking ON state was accomplished and could maintain good stability. Then, the ratios of the number of times of failures to the overall number of times of attempts were obtained to draw up a table. The measurements were done under such conditions that the disc had a rotational velocity of 3× and the servo filter had a gain crossover frequency of 3.6 kHz.

In FIG. 13, the polygons 1101, 1102, 1103 and 1104 represent situations where the frequencies of the disturbances provoked were 1.2 kHz, 1.8 kHz, 3.6 kHz, and 5.4 kHz, respectively. If the disturbances provoked had lower frequencies than the gain crossover frequencies of the servo filters as represented by the curves 1101 and 1102 and if the residual tracking error exceeded 25 nm, the probability of tracking failures increased steeply. On the other hand, in a situation where the disturbances provoked had frequencies equal to or higher than the gain crossover frequencies of the servo filters as represented by the curves 1103 and 1104, even if the residual tracking error exceeded 25 nm, the probability of tracking failures did not increase significantly. That is to say, the present inventors confirmed that the residual tracking error components above the gain crossover frequency of the servo filter did not affect the stability of the tracking servo. The present inventors also confirmed that even in a situation where the residual tracking error components had frequencies equal to or lower than the gain crossover frequency, if the residual tracking error components were equal to or smaller than 25 nm, the stability was not affected while attempts were being made to establish the tracking servo loop.

For that reason, when the residual tracking errors of a 6× disc are measured on the outer area thereof at and outside of the radial location of 36 mm, the LPF that is one of the residual tracking error measuring filters preferably has a cutoff frequency of at least 3.6 kHz, which is as high as the gain crossover frequency. That is to say, as far as the cutoff frequency of the LPF is concerned, even when the residual tracking errors of a 6× disc are measured on the outer area thereof at and outside of the radial location of 36 mm, the same condition as the one adopted by a 4× disc inspecting apparatus is preferably used. Or the cutoff frequency of the LPF may also be higher than the one adopted by the 4× disc inspecting apparatus.

As already described for a situation where a disc needs to be inspected for residual tracking errors, on the 6× disc, the residual tracking error values have substantially the same tolerable amplitudes both inside of the radial location of 36 mm and at and outside of the radial location of 36 mm. For that reason, the same residual tracking error reference values for the BPF and LPF may be used as in inspecting the 4× disc.

As described above, if the 6× disc is inspected for residual tracking errors, the cutoff frequencies of the measuring filters are equalized with the gain crossover frequency while the gain crossover frequency of the servo filter maintained at 3.6 kHz, corresponding to the gain crossover frequency to be achieved by a real drive, in order to increase the servo stability and the production yield of optical discs. But the other measuring conditions may be the same as the ones shown in Table 2. Then, discs that would cause significant residual tracking errors can be singled out just as intended. By removing such optical discs, it is possible to avoid an unwanted situation where the tracking servo suddenly fails due to some disturbance or a situation where a significant residual tracking error causes an unintentional track jump during a write operation to write data on a neighboring track accidentally and/or erase the stored data by mistake.

What is more, the inspection can get done without changing the characteristics of the servo filter (e.g., the gain crossover frequencies among other things) between a 4× disc and a 6× disc or between the inside and outside of the switching radial location on a 6× disc. As a result, the inspecting apparatus may use the same servo filter for both purposes, which is beneficial in terms of the productivity of optical discs, too. That is to say, a 4× disc inspecting apparatus can be used as it is as a 6× disc inspecting apparatus. By combining the respective inspection lines together in this manner, there is no need to introduce a new inspecting apparatus, thus cutting down the equipment cost significantly. As a result, a huge number of optical discs can be mass-produced at a much lower cost, which is tremendously beneficial.

On top of that, there is no longer any need to suspend the tracking or focus control operation, modify the settings of the reference servo and then resume the tracking or focus control operation and optical disc inspection operation again in order to switch or change the servo filters according to the linear velocity. Thus, the entire surface of the disc can be inspected continuously for residual errors between different linear velocities just by changing the linear velocities. Consequently, the inspection can get done in a much shorter time. As a result, the tact time can be shortened and the productivity of the optical discs can be increased, thus cutting down the costs.

By using an inspecting apparatus for which those measuring conditions have been defined in advance, the entire surface of the optical disc can be inspected for residual tracking errors from the innermost edge through the outermost edge thereof. And if the residual tracking error values of the signals that have passed through the LPF and BPF are equal to or smaller than the reference values, the disc is passed as a GO. But if the residual error values exceed the reference values, the disc is a NO-GO.

The optical disc inspecting method of this preferred embodiment is preferably carried out by executing a program that instructs the inspecting apparatus to follow the inspection procedure described above. Such a program may be executed either by using a dedicated LSI built in the inspecting apparatus or by getting the data processing done by an external PC. Still alternatively, the program may also be executed with a piece of dedicated hardware.

Also, in measuring the residual errors, the cutoff frequencies of the LPF and BPF are switched outside of the control loop of the optical disc. That is why even if the cutoff frequencies of the LPF or the BPF are changed while a focus control or a tracking control is being performed, naturally the servo operation is not affected at all. Consequently, the amount of time it takes to get the inspection done never increases due to the change of filters.

Next, it will be described how to handle an optical disc that has turned out to have a residual focus or tracking error that exceeds the reference value as a result of the inspection.

Specifically, suppose a 6× disc has turned out to have a residual focus error and a residual tracking error, at least one of which exceeds reference values, when inspected by the optical disc inspecting method of this preferred embodiment.

In that case, the memory 114 is searched as shown in FIG. 5 for a piece of information about the innermost radial location at which the residual focus or tracking error exceeds the reference value among pieces of information about a single or multiple radial locations where the residual focus or tracking error exceeds the reference value.

Such a piece of information about the innermost radial location where the reference value is exceeded will be identified herein by Rx. If Rx is located inside of the switching radial location, then such an optical disc is determined to be a NO-GO.

However, if Rx is located outside of the switching radial location, then an area of that disc outside of the Rx location is inspected again under the same conditions as the ones for a 4× disc. And if the disc turns out to be a GO under the inspection conditions for a 4× disc, then such an optical disc satisfies the 4× disc residual error conditions overall. That is why such an optical disc may be used as a 4× disc, instead of a 6× disc. Hereinafter, it will be described how to use such an optical disc as a 4× disc.

First of all, since such an optical disc was originally intended as a 6× disc, the information stored in its disc management area (PIC zone) already includes conditions for performing a write operation on it at 1×, 2×, 4× and 6× linear velocities (such as power and write strategy information for the highest linear velocity and every other linear velocity). In that case, the optical disc drive normally recognizes it as a 6× disc and may perform a write operation on it at the 6× linear velocity at most. The information stored in the PIC zone is not alterable because that zone is a read-only area.

For that reason, an additional area on which information for regulating or specifying the upper limit of the highest linear velocity can be written after the inspection is preferably provided for the 6× disc by modifying the physical format. And such a piece of information about the highest linear velocity Sx is written on that additional area as a result of the inspection. In that case, the optical disc drive is designed such that the information about the highest linear velocity that has been written on the additional area is given a higher priority than the information about the highest linear velocity that is stored in advance in the disc management area.

First, the optical disc drive determines whether or not the highest linear velocity information Sx has been written yet. If the answer is YES, the optical disc drive performs a write operation on a given optical disc following the Sx value (i.e., with Sx regarded as the highest linear velocity).

The information Sx may be written on the BCA that is a disc management area of the optical disc, the lead-in zone, the lead-out zone, or any other zone where the information may be added. For example, the highest linear velocity information Sx may be written on a PAC, a DMA or an OPC test zone inside at least one of the lead-in and lead-out zones and/or at least one of a Drive area and a Drive Calibration Zone (DCZ). As described above, the highest linear velocity information is preferably written on a dedicated area secured by the physical format standard. In that case, the upper limit of the write rate can be determined based on the result of the inspection and according to the quality of the mechanical property of the given optical disc. As a result, the production yield of optical discs can be increased significantly, thus increasing the productivity and cutting down the cost by leaps and bounds.

Next, if the disc that was made as a 6× disc has turned out, as a result of the inspection described above, to be usable as a 4× disc, then the radial location information Rx obtained by the inspection described above, as well as the Sx information, is written on a management area of the optical disc. Hereinafter, it will be described how to write that piece of information where.

As described above, the information stored in the PIC zone in the disc management area is not alterable because that zone is a read-only area. For that reason, an additional area on which information for regulating or specifying the upper limit of the radial location where the write operation can be performed at the highest linear velocity after the inspection is preferably provided for the 6× disc by modifying the physical format. And on that additional area, written is a piece of information Rx about the innermost radial location at which the residual focus or tracking error exceeds the reference value among pieces of information about a single or multiple radial locations where the residual focus or tracking error exceeds the reference value. In place of, or in addition to, the radial location information, physical address information (physical ADPI address, PAA) may also be written there. As a result, the write operation can be performed at the highest linear velocity 6× at radial locations between the switching radial location and Rx but may be performed at a decreased highest linear velocity 4× at radial locations outside of Rx where the residual errors increase. As a result, the write operation can be performed as quickly as possible according to the mechanical precision of the optical disc (i.e., can get done in a shorter time).

First, the optical disc drive determines whether or not the highest linear velocity information Sx has been written yet. If the answer is YES, the optical disc drive performs a write operation on the outer area of a given optical disc (i.e., outside of the switching radial location of 36 mm) at most at the highest linear velocity in accordance with the highest linear velocity information. However, if Rx has been written as well then the write operation is performed at the highest linear velocity 6× at radial locations between the switching radial location of 36 mm and Rx radial location but at the 4× linear velocity at radial locations outside of Rx.

Rx may be written on the BCA that is a disc management area of the optical disc, the lead-in zone, the lead-out zone, or any other zone where the information may be added. For example, the radial location information Rx may be written on a PAC, a DMA or an OPC test zone inside at least one of the lead-in and lead-out zones and/or at least one of a Drive area and a Drive Calibration Zone (DCZ). Optionally, the physical address information may be written instead of, or in addition to, the radial location information Rx. A dedicated area for storing the radial location information is preferably secured by the physical format standard. In that case, the upper limit of the radial location can be determined based on the result of the test and according to the quality of the mechanical property of the given optical disc. As a result, the write operation can be performed as quickly as possible according to the mechanical precision of the given disc (i.e., can get done in a shorter time), which is beneficial for the user.

On the optical disc, either both or one of the highest linear velocity information (Sx) and the radial location information (Rx) may be written. If these two pieces of information Sx and Rx are used in combination, the write operation needs to be performed with the linear velocities changed as in the following Table 3:

TABLE 3

| Sx | Rx (mm) | Write ranges and linear velocities |
|---|---|---|
| 6× | 57 | 24-36 mm: 4× |
|    |    | 36-57 mm: 6× |
|    |    | 57-58 mm: 4× |
| 6× | Non specified | 24-36 mm: 4× |
|    |    | 36-58 mm: 6× |
| 4× | 57 | 24-57 mm: 4× |
|    |    | 57-58 mm: 2× |

TABLE 3-continued

| Sx | Rx (mm) | Write ranges and linear velocities |
|---|---|---|
| 4× | Non specified | 24-58 mm: 4× |
| Non specified | 57 | 24-36 mm: 4× |
|    |    | 36-57 mm: 6× |
|    |    | 57-58 mm: 4× |
| Non specified | Non specified | 24-36 mm: 4× |
|    |    | 36-58 mm: 6× |

As can be seen from this Table 3,

If Sx=6× and Rx=57 mm, then the write operation needs to be performed at 4× linear velocity at radial locations of 24 mm to 36 mm, at 6× linear velocity at radial locations of 36 mm to 57 mm, and at 4× linear velocity at radial locations of 57 mm through 58 mm;

If Sx=6× but no Rx is specified, then the write operation needs to be performed at 4× linear velocity at radial locations of 24 mm to 36 mm and at 6× linear velocity at radial locations of 36 mm through 58 mm;

If Sx=4× and Rx=57 mm, then the write operation needs to be performed at 4× linear velocity at radial locations of 24 mm to 57 mm and at 2× linear velocity at radial locations of 57 mm through 58 mm;

If Sx=4× but no Rx is specified, then the write operation needs to be performed at 4× linear velocity at every radial location of 24 mm through 58 mm;

If Sx is not specified but Rx=57 mm, then the write operation needs to be performed at 4× linear velocity at radial locations of 24 mm to 36 mm, at 6× linear velocity at radial locations of 36 mm to 57 mm and at 4× linear velocity at radial locations of 57 mm to 58 mm; and If neither Sx nor Rx is specified, then the write operation needs to be performed at 4× linear velocity at radial locations of 24 mm to 36 mm and at 6× linear velocity at radial locations of 36 mm through 58 mm.

Unless Sx is specified, the highest write rate stored in the PIC zone is given a higher priority. On the other hand, if Rx is not specified, then the write operation may be performed either at 6× linear velocity outside of the switching radial location or at 4× linear velocity over the entire surface of the optical disc.

By writing Sx and/or Rx as additional pieces of information as described above, the production yield of optical discs can be increased, thus increasing the productivity and cutting down the cost at the same time. On top of that, the upper limit of the radial location can be determined based on the result of the inspection and according to the quality of the mechanical property of the given optical disc. As a result, the write operation can be performed as quickly as possible according to the mechanical precision of the given disc (i.e., can get done in a shorter time).

In the preferred embodiment described above, information Rx about the innermost radial location, which is one of numerous pieces of information about a single or multiple radial locations where either the residual focus error or residual tracking error exceeds its reference value, is written. And at and outside of that radial location, it is determined, on the inspection conditions for a 4× disc, whether or not the given disc is a GO or a NO-GO, thereby using that disc as a 4× disc at and outside of that radial location. Alternatively, information Ry about the outermost radial location, which is one of numerous pieces of information about a single or multiple radial locations where either the residual focus error or residual tracking error exceeds its reference value, may also be written. And if there is any area that can pass the residual error test on 6× disc conditions at and outside of that radial location represented by the information Ry, then that area at and outside of the radial location Ry may be used as a 6× disc.

In that case, the radial location information Ry and/or a physical address associated with the radial location information Ry may be written as the optical disc's proper information Ry on the BCA that is a disc management area, the lead-in zone, the lead-out zone, or any other appropriate storage area. In that case, if the optical disc drive consults those pieces of information, a read/write operation can be performed at 6× linear velocity outside of the radial location represented by the information Ry. That is to say, the read/write operation may be performed at 4× linear velocity from the innermost radial location on the disc through the switching radial location of 36 mm, at 6× linear velocity from the switching radial location of 36 mm through the Rx location, at 4× linear velocity from the Rx location through the Ry location, and then at 6× linear velocity again outside of the Ry location. As a result, the read/write operation can be performed at 6× linear velocity on a broader area, thus getting the read/write operation done in a shorter time.

Furthermore, if there are not a lot of radial locations where either the residual focus error or the residual tracking error exceeds the reference value, then the information Rz about every radial location where the reference value is exceeded and/or a physical address associated with the radial location information Rz may be written as the optical disc's proper information Rz on the BCA that is a disc management area, the lead-in zone, the lead-out zone, or any other appropriate storage area. In that case, if the optical disc drive consults those pieces of information, a read/write operation can be performed at 6× linear velocity outside of the switching radial location of 36 mm except the Rz locations but at 4× linear velocity at those Rz locations. As a result, the read/write operation can be performed at 6× linear velocity on an even broader area, thus getting the read/write operation done in an even shorter time.

Furthermore, the Rx and Sx information may also be written even if the given disc has passed the test as a 6× disc. Alternatively, even if the given disc has passed the test as a 6× disc, that disc may also be used as a 4× disc with Sx regarded to be 4× on purpose. In that case, there is no need to manufacture those two types of optical discs (i.e., 6× discs and 4× discs) with the equipment changed but either 6× discs or 4× discs may be just manufactured so as to strike an adequate balance between demand and supply without changing the manufacturing facilities. Added to that, the same stamper may be used for both 4× discs and 6× discs, and therefore, there is no need to make multiple stampers. As a result, the equipment cost, and eventually the overall manufacturing cost, can be cut down significantly.

Still alternatively, as for a 6× disc, a switching radial location unique to the given optical disc may be determined, irrespective of the switching radial location of 36 mm, based on a result of inspection done on the 6× disc for residual focus and tracking errors, and information Rw about that radial location may be stored on the disc. Specifically, the entire surface of the 6× disc is preferably inspected for residual focus and tracking errors, irrespective of the switching radial location, to see if the 6× disc satisfies the requirements about those residual errors, thereby finding information Rw about the outermost radial location among numerous pieces of information about a single or multiple radial locations where the residual focus error or residual tracking error exceeds the reference value. And the information Rw is written on the BCA that is a disc management area, the lead-in zone, the lead-out zone, or any other appropriate storage area. In that case, if the optical disc drive consults those pieces of information, a read/write operation can be performed at 6× linear velocity at and outside of the Rw location irrespective of the switching radial location of 36 mm but at 4× linear velocity inside of the Rw location. As a result, the read/write operation can be performed in the shortest time according to the mechanical property of the given disc. In that case, however, the radial location information Rw is preferably determined such that the rotational velocity that achieves the 6× linear velocity at the radial location represented by the information Rw does not exceed 10,000 rpm, for example.

Hereinafter, it will be described how to handle a disc that actually is a 4× disc but has turned out to satisfy the residual focus and tracking error requirements for a 6× disc as a result of the inspection.

If a 4× disc has been inspected to see if the disc satisfies the residual focus and tracking error requirements for 4× and 6× discs and if the 4× has turned out to have a mechanical precision that is comparable to that of a 6× disc, then the 4× disc has mechanical precision that is high enough to use it as a 6× disc. That is to say, in terms of performance, the 4× disc could be used as a 6× disc. However, in the PIC zone within the disc management area of the 4× disc, stored in advance are conditions for performing a write operation on it at 1×, 2× and 4× linear velocities (e.g., power and write strategy information at the highest linear velocity an at every other linear velocity). In that case, the optical disc drive normally recognizes it as a 4× disc and may perform a write operation on it at the 4× linear velocity at most.

The information stored in the PIC zone is not alterable because that zone is a read-only area. That is why an additional storage area to store the highest linear velocity information (Sx) after the inspection is provided for the 4× disc by modifying the physical format. And based on a result of inspection, information about the highest linear velocity (6×) is stored in that additional storage area.

The optical disc drive determines whether or not the highest linear velocity information Sx has been written on the 4× disc yet. If the answer is YES, the optical disc drive performs a write operation on a given optical disc in accordance with the highest linear velocity information (i.e., at 6× in this example).

The information Sx about the highest linear velocity may be written on the BCA that is a disc management area of the optical disc, the lead-in zone, the lead-out zone, or any other zone where the information may be added. For example, the highest linear velocity information Sx may be written on a PAC, a DMA or an OPC test zone inside at least one of the lead-in and lead-out zones and/or at least one of a Drive area and a Drive Calibration Zone (DCZ). As a result, the upper limit of the write rate can be determined based on the result of the inspection and according to the quality of the mechanical property of the given medium. Consequently, the production yield of optical discs can be increased significantly, thus increasing the productivity and cutting down the cost by leaps and bounds. As described above, if a 4× disc has turned out to be as good as a 6× disc as a result of the residual error test, then an overdrive write operation may be performed on it with the 4× disc supposed to be a 6× disc. Compared to a normal 4× optical disc with no residual error test result stored in its management information area, the optical disc drive can perform an overdrive write operation on such a pseudo-6× disc with more reliability and more quickly.

By writing Rx and Sx as described above, various effects are achieved. Firstly, as far as productivity is concerned, 4× discs and 6× discs can be inspected by a single line and only discs with good enough properties can be sorted out as 6× discs. Also, if only 6× discs were manufactured and if the production yield turned out to be low as a result of the residual error test, then quite a few of those discs should be thrown away. However, just by writing those pieces of additional information Rx and Sx, such a risk can be reduced significantly, the productivity of the discs can be increased, and the overall cost can be cut down. Also, generally speaking, in a situation where discs are formed using the same stamper continuously, the greater the number of discs manufactured, the worse their mechanical property and the lower the production yield tend to be. Even so, those discs with deteriorated mechanical properties can still be used as 4× discs because the requirements about residual errors for 4× discs are less strict than 6× discs'. That is why discs are manufactured only as 6× discs during an early stage of the manufacturing process when the stamper is still new. But even when the stamper has deteriorated to the point that some of those discs turn out to fall short of the 6× disc residual error standard but do meet the 4× disc residual error standard, such discs may continue to be manufactured as 4× discs. As a result, the number of discs that can be manufactured with the same stamper can be increased without decreasing the production yield. That is to say, the life of the stamper can be extended and eventually the overall manufacturing cost can be cut down.

In the example described above, Sx and Rx are supposed to be written as additional information and the discs are used as either 4× discs or 6× discs based on the result of the residual error test. In that case, the discs may naturally be inspected separately in advance in terms of mechanical properties, read/write performances and other properties, not just residual errors.

Also, when the optical disc is inspected for the residual focus and tracking errors, the laser beam irradiating the optical disc is supposed to maintain constant readout power, no matter whether the linear velocities have been switched or not. By inspecting the optical disc with the same readout power before and after the linear velocities are switched, there is no need to adjust the circuit offset of the inspecting apparatus, which should be done if the readout powers were changed, thus getting the inspection done in a shorter time.

Furthermore, if the disc is supposed to be rotated at two different linear velocities with the readout power of the radiation kept constant for the two velocities, more damage will be done by the readout radiation on the optical disc when it is rotated at the lower one of the two linear velocities. That is why while rotating at the lower linear velocity, the optical disc may be subjected to a read durability test. By testing the disc with the same readout power in this manner, the disc does not have to be subjected to a read durability test at multiple different linear velocities, thus contributing to increasing the productivity of optical discs.

The inspecting method of the present invention is applicable to both HTL (high to low) and LTH (low to high) types of BD-Rs. Also, the inspecting method of the present invention is applicable to both single-layer optical discs and dual-layer optical discs alike.

Furthermore, in the foregoing description, the inspecting method of the present invention is supposed to be applied to a BD-R. However, the same method is applicable to a rewritable BD-RE and a read-only BD-ROM, too.

In the foregoing description, the optical disc inspecting method of the present invention is supposed to be used to inspect 6× discs. However, the same method can be naturally used to inspect 8× discs, or optical discs on which information is supposed to be written at even higher rates, for residual errors.

An 8× disc may have two radial locations to switch the linear velocities at as shown in FIG. 4. That is why on an 8× disc, a CLV write operation can be performed with the linear velocities changed in three stages according to the radial location, e.g., at 4× linear velocity inside of the inner radial location of 36 mm, at 6× linear velocity between the two switching radial locations of 36 mm and 48 mm, and then at 8× linear velocity at and outside of the outer radial location of 48 mm. FIG. 4 shows the relations between the radial location and rotational velocity in a situation where a CLV read/write operation is performed on an 8× disc with the linear velocities changed according to the radial location from 4× into 6× and then into 8×. The rotational velocity at the reference radial location in the innermost part of the 4× CLV area is defined to be the highest possible rotational velocity for the respective linear velocities. Specifically, the first switching radial location may be defined somewhere between approximately 33-36 mm and the second switching radial location may be defined somewhere between approximately 44-48 mm. And the write operation may be performed at 4× linear velocity inside of the first switching radial location, at 6× linear velocity between the first and second switching radial locations, and then at 8× linear velocity outside of the second switching radial location. In that case, compared to the example described above in which the linear velocities are switched between 4× and 8× at only one radial location, the overall transfer rate can be increased and the write time can be shortened because the write operation can be carried out at 6×, not 4×, between the first and second switching radial locations. And even such an 8× disc can also be inspected for residual focus and tracking errors by the same method as what has already been described.

Figure 14:
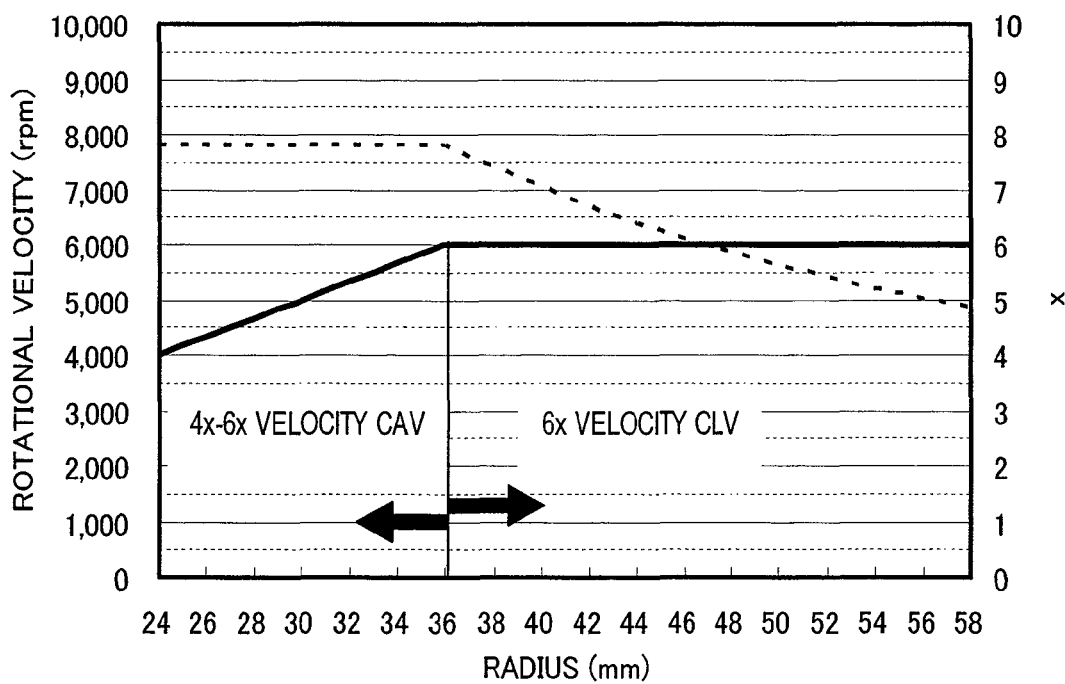
FIG. 14 shows the relations between the radial location and the rotational velocity in a situation where a read/write operation is performed with the modes of control operations changed from 4× CAV into 6× CLV according to the radial location in a preferred embodiment of the present invention.

Alternatively, in inspecting a 6× disc, the linear velocities may also be changed between 4× and 6× as shown in FIG. 14. Specifically, in that case, a constant angular velocity (CAV) write operation may be performed at a rotational velocity corresponding to 4× (i.e., approximately 8,000 rpm if r=24 mm) in the innermost area inside of the first switching radial location, and the modes of the write operation may be changed into 6× CLV at a switching radial location of approximately 33-36 mm. In that case, the highest write rate is achieved and data can be written on a single disc in the shortest time.

In a situation where the area on which the write operation is supposed to be performed by the CAV control technique is inspected for residual errors, the residual error test is started at a rotational velocity that is a half as high as the CAV rotational velocity and then the linear velocity gradually increases as the test beam goes farther toward outer radial locations. That is why until the switching radial location is reached, the residual error test may be carried out with the cutoff frequencies of the measuring filters (which are an LPF and a BPF in inspecting the disc for residual focus errors and a BPF in inspecting the disc for residual tracking errors) changed according to the radial location. And when and after the switching radial location is reached, the residual error test may be carried out by the inspecting method described above.

In the preferred embodiments described above, to determine a switching radial location, a radial location, where the linear velocity becomes the highest rotational velocity while a read/write operation is performed inside of the switching radial location, is found. On a 6× disc, the switching radial location is within the range of approximately 33 mm to 36 mm as described above. That is why the switching radial location may also be determined within this range even without finding the radial location where the rotational velocity will be the highest. Also, no matter whether or not such a radial location where the rotational velocity will be the highest has been found to determine the switching radial location, the residual error does not have to be measured at that radial location where the rotational velocity will be the highest. This is because the radial location where the linear velocity during a read/write operation will be the highest rotational velocity inside of the switching radial location may not belong to the user data area. That is why the 6× disc may be inspected for residual errors under the same conditions as the ones for a 4× disc inside of the switching radial location and under the same conditions as what has already been described at and outside of the switching radial location.

Also, in the preferred embodiments described above, the switching radial location (i.e., a reference radial location where the measuring velocities are switched) for a 6× disc (i.e., a disc on which a read/write operation can be performed at 6× linear velocity at least at some radial location) is defined at 36 mm. And the residual errors are supposed to be measured at 2× linear velocity as in a 4× disc inside of the radial location of 36 mm and at 3× linear velocity at and outside of the radial location of 36 mm. However, since the "switching radial location" is a boundary at which the linear velocities are switched, the residual error may be measured at that switching radial location at either 2× linear velocity or 3× linear velocity. That is to say, the residual errors may be measured at 2× linear velocity as in a 4× disc at and inside of the radial location of 36 mm and at 3× linear velocity outside of the radial location of 36 mm.

As described above, the present invention provides an optical disc in which the rotational velocities are switched between the first and second linear velocities Lv1 and Lv2 (where Lv1<Lv2) at a radial location where one of the two linear velocities reaches the same highest rotational velocity as the other linear velocity's. The present invention also provides a write-once (or rewritable) optical disc such as a BD on which a write operation can be performed at as high a linear velocity as 6× or at even higher velocities by adopting an optical disc residual error inspecting method. According to that method, the optical disc is inspected for residual errors at a rotational velocity that is a half as high as the write rate on the disc. The residual error (residual) is measured based on a focus error signal and a tracking error signal under such measuring conditions on which the two rotational velocities have the same servo filter characteristic (i.e., the gain crossover frequency). And it is determined whether or not the residual error falls within a prescribed range. The present invention further provides a method and apparatus for inspecting the optical disc precisely such that good write signal quality and servo stability are achieved when a signal is written on such an optical disc. And the present invention further provides a method for writing a signal of quality on such an optical disc.

A degree of asymmetry representing the ratio of a pit or a recording mark to a space is another index of rating the quality of a read signal generated from an optical information storage medium. In addition to, or instead of, the jitter described above, such a degree of asymmetry may also be measured. For example, the respective centers of amplitudes of the shortest mark (which has a length of 2 T in 1-7 modulation) and the longest mark (which has a length of 8 T in 1-7 modulation) are calculated and the degree of asymmetry is adjusted with respect to those centers so as to fall within a predetermined range, thereby ensuring good signal quality.

Specifically, the ratio of the difference between the respective centers of amplitudes of the longest and shortest marks to the full amplitude of the longest mark is adjusted so as to fall within a predetermined range. More specifically, suppose if the longest mark has a length of 8 T, the longest mark has the maximum amplitude of I(8 H), the minimum amplitude of I(8 L), and the full amplitude of I(8 pp), and if the shortest mark has a length of 2 T, the shortest mark has the maximum amplitude of I(2 H) and the minimum amplitude of I(2 L). In that case, the center of the amplitude of the longest mark will be calculated by (I(8 H)−I(8 L))/2, the center of the amplitude of the shortest mark will be calculated by (I(2 H)−I(2 L))/2, and the full amplitude I(8 pp) of the longest mark will be calculated by I(8 H)−I(8 L). That is why the ratio will be calculated by ((I(8 H)−I(8 L))/2−(I(2 H)−I(2 L))/2)/I(8 pp). And if this value falls within the predetermined range (e.g., equal to or greater than −0.10 and/or equal to or smaller than +0.15), then the quality of the read signal may be rated to be good.

Optionally, the optical information storage medium may have the following raised portion. As for a Blu-ray Disc, for example, its protective coating has a thickness of 100 μm if it is a single-layer disc and a thickness of 75 μm if it is a dual-layer disc. To prevent such a thin protective coating from getting scratched, a raised portion may be provided inside or outside of the clamp area. For example, particularly if such a raised portion is arranged inside of the clamp area, the protective coating will not get scratched. On top of that, since the raised portion is located near the center hole of the disc, the load to be imposed on the rotating spindle (motor) in order to balance the weight of the raised portion can be reduced and potential collision against the optical head can be avoided as well. The collision between the raised portion and the optical head can be avoided by arranging the raised portion inside of the clamp area because the optical head accesses the information storage area that is located outside of the clamp area.

If the clamp area is arranged inside, the clamp area may be located at the following position on a disc with an outside diameter of 120 mm. Supposing the center hole has a diameter of 15 mm and the clamp area covers the range from 23 mm through 33 mm in diameter, the raised portion will be arranged between the center hole and the clamp area, i.e., in the range of 15 mm to 23 mm in diameter. In that case, the raised portion may be located at some distance from the center hole (e.g., at a distance of 0.1 mm or more (and/or 0.125 mm or less) from the peripheral edge of the center hole). The raised portion may also be located at some distance from the clamp area (e.g., at a distance of 0.1 mm or more (and/or 0.2 mm or less) from the inner edge of the clamp area). And the raised portion may also be located at some distances from both the peripheral edge of the center hole and the inner edge of the clamp area. Specifically, the raised portion may be arranged in the range of 17.5 mm to 21.0 mm in diameter, for example. The height of the raised portion may be determined so as to strike an adequate balance between an expected degree of protection of the protective coating from scratches and the readiness to lift and remove the disc. However, if the raised portion were too high, then another problem could arise. For that reason, the raised portion may have a height of 0.12 mm or less as measured from the surface of the clamp area.

Hereinafter, it will be described briefly what structure the optical information storage medium needs to have if the storage medium has multiple storage layers. For example, supposing the optical information storage medium is a single-sided disc, from/on which information is read and/or written by having a laser beam incident on the protective coating side, if two or more storage layers need to be provided, then there are multiple storage layers between the substrate and the protective coating. In that case, the multilayer structure may be defined as follows. Specifically, a reference layer L0 may be arranged at the deepest level that is located at a predetermined depth from the light incoming surface. Multiple storage layers L1, L2, ... and Ln may be stacked one upon the other from over the reference layer toward the light incoming surface. And the depth of the reference layer as measured from the light incoming surface in the multi-layer disc may be equal to the depth (e.g., approximately 0.1 mm) of the only storage layer of a single-layer disc as measured from the light incoming surface. If the depth of the deepest layer is constant irrespective of the number of storage layers stacked, compatibility can be ensured in accessing the reference layer. In addition, even if the number of storage layers stacked increases, the influence of tilt will not increase. This is because although the deepest layer is affected by tilt most, the depth of the deepest layer does not increase in this case even if the number of storage layers stacked is increased.

As for the scanning direction or beam spot moving direction in such a situation where the optical information storage medium has multiple storage layers, the optical information storage medium may be either a parallel path type or an opposite path type. In a disc of the parallel path type, the data area is scanned in the same direction on every layer, i.e., from the innermost area toward the outermost area or vice versa. On the other hand, in a disc of the opposite path type, the scanning directions are changed into the opposite one every time the layers to scan are changed. For example, if the reference layer L0 is scanned from the innermost area toward the outermost area (which direction will be simply referred to herein as "outward"), then the L1 layer is scanned from outermost area toward the innermost area (which direction will be simply referred to herein as "inward"), the L2 layer is scanned outward, and so forth. That is to say, the Lm layer (where m is either zero or an even number) may be scanned outward and the Lm+1 layer may be scanned inward. Conversely, the Lm layer (where m is either zero or an even number) may be scanned inward and the Lm+1 layer may be scanned outward.

It will also be briefly described what modulation technique is adopted according to the present invention to perform a write operation while measuring the jitter. In writing data (which may be original source data or binary data yet to be modulated) on a storage medium, the data is divided into multiple sections of a predetermined size, each of those data sections of the predetermined size is further divided into a number of frames having a predetermined length, and then a predetermined sync code and/or sync code sequence is/are inserted into each frame (in a frame sync area). Then, the data that has been subdivided into those frames is written as a data code sequence that has been modulated following a predetermined modulation rule that matches the read/write signal characteristic of the storage medium (in a frame data area).

In this case, the modulation rule may be RLL (run length limited) coding technique that limits the mark length, for example. If the RLL coding technique is represented as RLL (d, k), where d and k are natural numbers that satisfy d<k, it means that the minimum number of zeros appearing between two ones is equal to d and the maximum number thereof is k. For example, where d=1 and k=7 and if T represents one reference modulation cycle, the recording marks and spaces will have the shortest length of 2 T and the longest length of 8 T. Optionally, this RLL (1, 7) modulation technique may also be modified into 1-7 PP modulation technique with the following features [1] and [2] introduced. In 1-7 PP, PP is the acronym of Parity preserve/Prohibit repeated minimum transition length. Specifically, the feature [1] lies in "Parity preserve", representing the first P, which means that the parity of the number of source data bits "1" yet to be modulated agrees with that of the number of ones of the modulated bit pattern. The second feature [2] is determined by the latter P (i.e., Prohibit repeated minimum transition length), which refers to a scheme for limiting the number of times of repetition of the shortest marks and spaces on a modulated write waveform. For example, the number of times of repetition of 2 T may be defined to be at most six times.

Next, a frame sync pattern for use in performing a write operation while measuring the jitter according to the present invention will be described. The predetermined modulation rule described above does not apply to the sync code/sync code sequence to be inserted between frames. That is why the sync code may have a pattern that has a different code length from the one defined by the modulation rule. This sync code/sync code sequence determines the timing of read processing when the written data is read, and therefore, may have the following pattern.

To distinguish the sync code from the data code sequence more easily, the sync code may have a unique pattern that never appears in the data code sequence. For example, the sync code may have marks or spaces that are even longer than the longest marks or spaces in the data code sequence or an alternation of such marks and spaces. In the 1-7 modulation technique, the lengths of marks and spaces are limited to 2 T through 8 T. Thus, the sync code may include marks or spaces with a length of 9 T or more that is longer than 8 T (i.e., 9 TM and/or 9 TS) or an alternation of 9 T marks and 9 T spaces (i.e., 9 T/9 T).

To get the phase locking process done more easily, a pattern with a lot of zero cross points may be included. For example, the sync code may include relatively short ones of the marks and spaces in the data code sequence or an alternation of such marks and spaces. When the 1-7 modulation technique is adopted, the sync code may include the shortest 2 T marks or spaces (i.e., 2 TM and/or 2 TS), an alternation of 2 T marks and 2 T spaces, (i.e., 2 T/2 T), the next shortest 3 T marks or spaces (i.e., 3 TM and/or 3 TS), or an alternation of 3 T marks and 3 T spaces, (i.e., 3 T/3 T).

Suppose an area including such a sync code sequence and a data code sequence will be referred to as a "frame area" and a unit including a number of (e.g., 31) such frame areas as a "sector". In that case, the intersymbol distance between the sync code sequence included in a certain frame area of one sector and the one included in another frame area of the same sector may be equal to or greater than two. As used herein, the "intersymbol distance" means the number of different bits between two code sequences being compared to each other. By defining the intersymbol distance to be two or more in this manner, even if one of the two sequences is read with a one bit shift error produced due to the influence of noise during reading, that sequence will never be taken for the other one by mistake. Also, the intersymbol distance between the sync code sequence included in the frame area at the top of that sector and the one included in another frame area of the same sector may be equal to or greater than two. In that case, it can be determined more easily whether or not the given frame area is located at the top of a sector (or at the boundary between two sectors).

It should be noted that the intersymbol distance could be the distance between code sequences according to the NRZ notation if an NRZ write operation is performed but could also be the distance between sequences according to the NRZI notation if an NRZI write operation is performed. For that reason, if the RLL modulation technique is adopted, then it means that the number of high or low levels that appear consecutively on an NRZI write waveform should be limited.

That is why it means that the intersymbol distance according to the NRZI notation should be equal to or greater than two.

Furthermore, if grooves are cut on an optical information storage medium, the storage medium comes to have groove portions and land portion between the groove portions. That is why the methods of writing data need to be changed depending on whether data should be written on groove portions or on land portions. Specifically, data can be written in various manners, e.g., only on groove portions, only on land portions, or both on groove and land portions. In this case, a method of writing data on portions (i.e., either groove portions or land portions) that are raised as viewed from under the light incoming surface is called "On-Groove" writing. On the other hand, a method of writing data on portions that are depressed as viewed from under the light incoming surface is called "In-Groove" writing. According to the present invention, at least one of these two writing methods may be adopted arbitrarily. That is to say, only the On-Groove writing or only the In-Groove writing should be adopted, or one of these two methods could be used selectively.

If one of these two writing methods needs to be permitted selectively, writing method specifying information, indicating which of the two writing methods (i.e., the On-Groove writing or In-Groove writing) should be adopted for the medium, may be written on the medium. As for a multilayer medium, the writing method specifying information for the respective layers needs to be stored. In that case, the writing method specifying information for the respective layers may be stored collectively in the reference layer (which could be the deepest (L0) or shallowest layer as viewed from under the light incoming surface or the layer to be accessed earlier than any other layer during a disc loading process). Alternatively, only an associated piece of writing method specifying information may be stored in each layer. Still alternatively, the writing method specifying information for all layers could be stored on each and every layer.

Also, the writing method specifying information could be stored in the BCA (burst cutting area) or a disc information area or superposed on the wobbled groove. The disc information area is located inside and/or outside of the data storage area and used to store mainly control information. The disc information area is a read-only area and may have a broader track pitch than the data storage area. The writing method specifying information could be stored in one, any two, or even all, of these areas and portions.

Furthermore, the direction in which the groove starts wobbling for the very first time according to the On-Groove writing method may be opposite to the one according to the In-Groove writing method. That is to say, if the groove starts to wobble inward (i.e., toward the center of the disc) according to the On-Groove writing method, then the groove should start to wobble outward according to the In-Groove writing method. Alternatively, if the groove starts to wobble outward according to the On-Groove writing method, then the groove should start to wobble inward according to the In-Groove writing method. In this manner, by getting the groove to start wobbling in mutually opposite directions between the On-Groove and In-Groove writing methods, the polarity of tracking can be the same, no matter which of these two methods is adopted. This is because although a write operation is performed on the raised portion according to the On-Groove writing method as viewed from under the light incoming surface, a write operation is performed on the depressed portion according to the In-Groove writing method as viewed from under the light incoming surface. That is why supposing the groove depths are the same between these two methods, their tracking polarities will be opposite to each other. Thus, if the groove is supposed to start wobbling in mutually opposite directions between these two methods, then their tracking polarities should be the same.

The In-Groove and On-Groove writing methods described above are applied to a recordable medium on which grooves are supposed to be cut. However, a similar idea is applicable to a read-only medium, too. More specifically, as for a read-only medium, information is stored in the forms of an embossed pattern (i.e., raised and depressed pits). As for the method of formed such pits, a technique for forming raised pits as viewed from under the light incoming surface is called "On-Pit technique" and a technique for forming depressed pits as viewed from under the light incoming surface is called "In-Pit technique". According to the present invention, at least one of these two methods may be adopted arbitrarily. That is to say, only the On-Pit technique or only the In-Pit technique should be adopted, or one of these two methods could be used selectively.

If one of these two methods needs to be permitted selectively, pit forming method specifying information, indicating which of the two methods (i.e., the On-Pit technique or In-Pit technique) should be adopted for the medium, may be written on the medium. As for a multilayer medium, the pit forming method specifying information for the respective layers needs to be stored. In that case, the pit forming method specifying information for the respective layers may be stored collectively in the reference layer (which could be the deepest (L0) or shallowest layer as viewed from under the light incoming surface or the layer to be accessed earlier than any other layer during a disc loading process). Alternatively, only an associated piece of pit forming method specifying information may be stored in each layer. Still alternatively, the pit forming method specifying information for all layers could be stored on each and every layer.

Also, the pit forming method specifying information could be stored in the BCA (burst cutting area) or a disc information area. The disc information area is located inside and/or outside of the data storage area and used to store mainly control information. The disc information area may have a broader track pitch than the data storage area. The pit forming method specifying information could be stored in one or both of these two areas.

The recording film of an optical information storage medium may have the following two different properties, which are determined by the reflectances of recorded and unrecorded portions thereof. Specifically, if the unrecorded portion has a higher reflectance than the recorded portion, then the recording film has high-to-low (H to L) property. On the other hand, if the unrecorded portion has a lower reflectance than the recorded portion, then the recording film has low-to-high (L to H) property. According to the present invention, at least one of these two recording film properties may be adopted arbitrarily. That is to say, the recording film of a given medium may have only the H to L property or only the L to H property. Or the recording film could permit one of these two properties selectively.

If one of these two properties needs to be permitted selectively, recording film property specifying information, indicating which of the two properties the recording film should have (i.e., either H to L or L to H), may be written on the medium. As for a multilayer medium, the recording film property specifying information for the respective layers needs to be stored. In that case, the recording film property specifying information for the respective layers may be stored collectively in the reference layer (which could be the deepest (L0) or shallowest layer as viewed from under the light incoming surface or the layer to be accessed earlier than any other layer during a disc loading process). Alternatively, only an associated piece of recording film property specifying information may be stored in each layer. Still alternatively, the recording film property specifying information for all layers could be stored on each and every layer.

Also, the recording film property specifying information could be stored in the BCA (burst cutting area) or a disc information area or superposed on the wobbled groove. The disc information area is located inside and/or outside of the data storage area and used to store mainly control information. The disc information area is a read-only area and may have a broader track pitch than the data storage area. The recording film property specifying information could be stored in one, any two, or even all, of these areas and portions.

The present invention has been described in detail by way of specific preferred embodiments. However, the present invention may also be defined as follows. Specifically, an optical information storage medium inspecting method according to the present invention is a method for inspecting an optical information storage medium for residual errors of a focus error signal or a tracking error signal. The method is characterized by including the steps of: irradiating the optical information storage medium with a laser beam and rotating the optical information storage medium by a constant linear velocity (CLV) control technique by reference to the radial location at which the laser beam forms a spot on the storage medium and changing the rotational velocities according to the radial location on the storage medium between at least two linear velocities that include a first linear velocity Lv1 and a second linear velocity Lv2, where Lv1<Lv2; performing a focus control and a tracking control on the optical information storage medium to generate a focus error signal and a tracking error signal based on the light that has been reflected from the optical information storage medium; getting the focus error signal and the tracking error signal processed by their associated types of frequency band-elimination filters to obtain respective residual errors of the focus and tracking error signals; and comparing the residual errors to predetermined reference values, thereby determining whether or not the residual errors fall within prescribed ranges of the reference values.

In one preferred embodiment, the optical information storage medium is inspected by being rotated at the first linear velocity Lv1 in an area between first and second radial locations R1 and R2 on the storage medium, where R1<R2. On the other hand, the optical information storage medium is inspected by being rotated at the second linear velocity Lv2 at or outside of the second radial location R2 on the storage medium.

In another preferred embodiment, the Lv2/Lv1 ratio of the second linear velocity Lv2 to the first linear velocity Lv1 is either 1.5 or 2.

In still another preferred embodiment, the first linear velocity Lv1 is 9.834 m/sec.

In yet another preferred embodiment, if Lv2/Lv1=1.5, the second radial location R2 satisfies 33 mm≦R2≦36 mm but if Lv2/Lv1=2.0, the second radial location R2 satisfies 44 mm≦R2≦48 mm.

In yet another preferred embodiment, the two radial locations R1 and R2 and the two linear velocities Lv1 and Lv2 satisfy R2/R1=Lv2/Lv1.

In yet another preferred embodiment, the highest rotational velocity of the medium being inspected at the first linear velocity is approximately equal to that of the medium being inspected at the second linear velocity.

In yet another preferred embodiment, the inspection is done at the first or second linear velocity that is a half or less as high as a linear velocity for writing that is stored in advance in a disc management area (PIC zone) on the optical information storage medium.

In yet another preferred embodiment, the inspection is done such that no matter whether the storage medium is being rotated at the first linear velocity or the second linear velocity, the servo characteristic of the focus control maintains the same gain crossover frequency and the servo characteristic of the tracking control also maintains the same gain crossover frequency.

In yet another preferred embodiment, the focus error signal is supplied to both of two different types of filters included in the frequency band-elimination filter for the focus error signal. The two filters are a low-pass filter (LPF) with a cutoff frequency FcL and a band-pass filter (BPF), of which the lower and higher cutoff frequencies are FcL and FcH, respectively. The frequencies FcL and FcH are changed on a scalable basis according to the ratio of the second linear velocity to the first linear velocity.

In yet another preferred embodiment, the tracking error signal is supplied to both of two different types of filters included in the frequency band-elimination filter for the tracking error signal. The two filters are a low-pass filter (LPF) with a cutoff frequency TcL and a band-pass filter (BPF), of which the lower and higher cutoff frequencies are TcL and TcH, respectively. TcL is constant irrespective of the ratio of the second linear velocity to the first linear velocity and TcH is changed on a scalable basis according to the ratio of the second linear velocity to the first linear velocity.

In yet another preferred embodiment, the values F_LPF and F_BPF in two different frequency bands of the focus error signal that has passed through the LPF and the BPF, respectively, are compared to their predetermined reference value, thereby determining whether or not the F_LPF and F_BPF values fall within their associated prescribed range. The values T_LPF and T_BPF in two different frequency bands of the tracking error signal that has passed through the LPF and the BPF, respectively, are compared to their predetermined reference value, thereby determining whether or not the T_LPF and T_BPF values fall within their associated prescribed range.

In yet another preferred embodiment, if the F_LPF, F_BPF, T_LPF and T_BPF values are compared to the predetermined reference values at one radial location after another, then these four values are compared to two different sets of predetermined reference values that are associated with the first and second linear velocities, respectively.

In yet another preferred embodiment, the reference value for the F_LPF value at the second linear velocity is approximately equal to or greater than the reference value for the F_LPF value at the first linear velocity.

In yet another preferred embodiment, when the storage medium is inspected for residual focus and tracking errors, the readout power of the laser beam to irradiate the optical information storage medium is kept constant irrespective of the linear velocity.

An inspecting apparatus according to the present invention is an apparatus for inspecting an optical information storage medium for the residual errors of a focus error signal and a tracking error signal. The apparatus includes: an optical pickup for irradiating the optical information storage medium with a laser beam; a spindle motor for rotating the optical information storage medium; a rotational velocity setting section for performing a constant linear velocity (CLV) control by reference to the radial location at which the laser beam forms a spot on the storage medium and changing the rotational velocities according to the radial location on the storage medium between at least two linear velocities that include a first linear velocity Lv1 and a second linear velocity Lv2, where Lv1<Lv2; a focus signal residual error measuring section for performing a focus control to generate a focus error signal based on the light reflected from the optical information storage medium and measuring the residual error (residual) of the focus error signal by the level of the focus error signal; a tracking signal residual error measuring section for performing a tracking control to generate a tracking error signal based on the light reflected from the optical information storage medium and measuring the residual error (residual) of the tracking error signal by the level of the tracking error signal; a memory for retaining the residual errors that have been measured at each radial location by the focus signal residual error measuring section and the tracking signal residual error measuring section; and a decision section for comparing the residual errors measured to predetermined residual focus and tracking error reference values, thereby determining whether or not the residual errors fall within prescribed ranges of the reference values.

In one preferred embodiment, the residual error (residual) of the focus error signal is obtained by getting the focus error signal processed by its associated type of frequency band-elimination filter, which is provided in the focus signal residual error measuring section. The residual error (residual) of the tracking error signal is obtained by getting the tracking error signal processed by its associated type of frequency band-elimination filter, which is provided in the tracking signal residual error measuring section.

In another preferred embodiment, information is written on an optical information storage medium by irradiating the storage medium with a laser beam and rotating the medium by a constant linear velocity (CLV) control technique by reference to the radial location at which the laser beam forms a spot on the storage medium. Data is written by rotating the medium at a third linear velocity Lv3 within an area of the medium between first and second radial locations R1 and R2, where R1<R2. On the other hand, data is written by rotating the medium at a fourth linear velocity Lv4 (where Lv3<Lv4) at or outside of the second radial location R2 on the storage medium. And the radial location R2 to change the linear velocities is determined such that the highest rotational velocity of the third linear velocity at R1 becomes approximately equal to that of the fourth linear velocity at R2.

In one preferred embodiment, the third linear velocity Lv3 is 19.7 m/sec, the fourth linear velocity Lv4 is either 29.5 m/sec or 39.4 m/sec, and the second radial location R2 satisfies 33 mm$\leq$R2$\leq$36 mm if Lv4/Lv3=1.5 and satisfies 44 mm$\leq$R2$\leq$48 mm if Lv4/Lv3=2.0.

According to a method of writing information on an optical information storage medium according to the present invention, the residual focus and tracking errors are obtained by getting the memory searched by the apparatus described above. If the residual focus and tracking errors exceed their prescribed ranges of the reference values, information about the innermost radial location Rx is searched for among multiple pieces of information about radial locations where one or multiple prescribed ranges are exceeded. And the information about the innermost radial location Rx is written on a BCA of the optical information storage medium and/or on a predetermined area in at least one of lead-in and lead-out zones to which an additional piece of information can be written. Optionally, instead of, or in addition to, the radial location information, physical address information may also be written there.

According to a method of writing information on an optical information storage medium according to the present invention, the residual focus and tracking errors are obtained by getting the memory searched by the apparatus described above, thereby determining whether or not the residual focus or tracking error satisfies the prescribed range of its associated reference values of linear velocities. And based on the result of the decision, the highest writable linear velocity (Sx) is written on a BCA of the optical information storage medium and/or on a predetermined area in at least one of lead-in and lead-out zones to which an additional piece of information can be written.

In one preferred embodiment, the highest writable linear velocity Sx and/or the radial location information Rx is/are written on a PAC, a DMA or an OPC test zone inside at least one of the lead-in and lead-out zones and/or at least one of a Drive area and a Drive Calibration Zone (DCZ). Optionally, instead of, or in addition to, the radial location information, physical address information may also be written there.

In another preferred embodiment, the highest linear velocity, about which information is stored in advance on a read-only management area (PIC zone), is 19.7 m/sec or less.

On an optical information storage medium according to the present invention, information is written by the method of writing information on the optical information storage medium described above.

In one preferred embodiment, the optical information storage medium is a Blu-ray disc (which is either a BD-R or a BD-RE) on which information can be written at 6× or higher rates.

In another preferred embodiment, a rewritable area or a write-once area inside a BCA, a lead-in zone and/or a lead-out zone of the optical information storage medium includes an area on which information about the highest writable linear velocity Sx and/or information about the radial location Rx is/are written. Optionally, instead of, or in addition to, the radial location information, physical address information may also be written there. Also, if the optical information storage medium satisfies the prescribed range of the reference values at different locations or range from the storage locations of the radial location information and/or physical address information (e.g., outside of the radial location and/or the physical address), then information about such different locations or range may be written as information unique to the optical information storage medium.

The present invention can be used effectively in a method and apparatus for inspecting an optical information storage medium to get a read/write operation done quickly with high densities, an optical information storage medium, and a method of writing information. Such an optical information storage medium on which a read/write operation can be done quickly with high densities and its associated recorder and player can be used effectively in digital consumer electronic appliances and information processors.

The invention claimed is:

1. A method for inspecting an optical information storage medium, the method comprising the steps of:
    irradiating the optical information storage medium with a laser beam and rotating the storage medium by a constant linear velocity control technique by reference to the radial location at which the laser beam forms a spot on the storage medium;
    changing the rotational velocities according to the radial location on the storage medium between at least two linear velocities that include a first linear velocity Lv1 and a second linear velocity Lv2, which is higher than the first linear velocity Lv1;
    generating a focus error signal and/or a tracking error signal based on the light reflected from the storage medium;

performing a focus control and/or a tracking control on the laser beam that irradiates the storage medium based on the focus error signal and/or the tracking error signal; and passing branched outputs of the focus error signal and/or the tracking error signal through predetermined types of frequency band-elimination filters for the focus and/or tracking error signal(s) to obtain residual errors of the focus and/or tracking error signal(s) and comparing the residual errors to predetermined reference values, wherein the frequency band-elimination filter for the focus error signal includes a low-pass filter LPF with a cutoff frequency LPF_FcL and a band-pass filter BPF with a lower cutoff frequency BPF_FcL and a higher cutoff frequency BPF_FcH, wherein the branched output of the focus error signal is supplied to the low-pass filter LPF and the band-pass filter BPF, wherein if the optical information storage medium is rotated at the first and second linear velocities and subjected to the focus control to make a comparison to the predetermined reference value, LPF_FcL, BPF_FcL and BPF_FcH are switched one after another according to the ratio of the second linear velocity to the first linear velocity, wherein the frequency band-elimination filter for the tracking error signal includes a low-pass filter LPF with a cutoff frequency LPF_TcL and a band-pass filter BPF with a lower cutoff frequency BPF_TcL and a higher cutoff frequency BPF_TcH, wherein the branched output of the tracking error signal is supplied to the low-pass filter LPF and the band-pass filter BPF, wherein LPF_TcL and BPF_TcL are constant irrespective of the first and second linear velocities, and wherein BPF_FcH is switched one after another according to the ratio of the second linear velocity to the first linear velocity.

2. A method of recording information on the optical information storage medium inspected by the method for inspecting an optical information storage medium according to claim 1, the method comprising the step of irradiating the optical information storage medium with light and rotating the optical information storage medium;

recording information on the optical information storage medium at a third linear velocity Lv3 within an area of the optical storage medium at or inside of a predetermined radial location R2; and recording information on the optical information storage medium at a fourth linear velocity Lv4 (Lv3<Lv4) within another area of the optical storage medium outside of the predetermined radial location R2.

3. An apparatus for recording information on the optical information storage medium inspected by the method for inspecting an optical information storage medium according to claim 1, the apparatus comprising:

a motor for rotating the optical information storage medium; and an optical pickup for irradiating the optical information storage medium with light and recording information on the optical information storage medium at a third linear velocity Lv3 within an area of the optical storage medium at or inside of a predetermined radial location R2 and records information on the optical information storage medium at a fourth linear velocity Lv4 (Lv3<Lv4) within another area of the optical storage medium outside of the predetermined radial location R2.

4. A method for inspecting an optical information storage medium and reading information from the optical information storage medium, the method comprising the steps of:

irradiating the optical information storage medium with a laser beam and rotating the storage medium by a constant linear velocity control technique by reference to the radial location at which the laser beam forms a spot on the storage medium;

changing the rotational velocities according to the radial location on the storage medium between at least two linear velocities that include a first linear velocity Lv1 and a second linear velocity Lv2, which is higher than the first linear velocity Lv1;

generating a focus error signal and/or a tracking error signal based on the light reflected from the storage medium;

performing a focus control and/or a tracking control on the laser beam that irradiates the storage medium based on the focus error signal and/or the tracking error signal;

passing branched outputs of the focus error signal and/or the tracking error signal through predetermined types of frequency band-elimination filters for the focus and/or tracking error signal(s) to obtain residual errors of the focus and/or tracking error signal(s) and comparing the residual errors to predetermined reference values, wherein the frequency band-elimination filter for the focus error signal includes a low-pass filter LPF with a cutoff frequency LPF_FcL and a band-pass filter BPF with a lower cutoff frequency BPF_FcL and a higher cutoff frequency BPF_FcH, wherein the branched output of the focus error signal is supplied to the low-pass filter LPF and the band-pass filter BPF, wherein if the optical information storage medium is rotated at the first and second linear velocities and subjected to the focus control to make a comparison to the predetermined reference value, LPF_FcL, BPF_FcL and BPF_FcH are switched one after another according to the ratio of the second linear velocity to the first linear velocity, wherein the frequency band-elimination filter for the tracking error signal includes a low-pass filter LPF with a cutoff frequency LPF_TcL and a band-pass filter BPF with a lower cutoff frequency BPF_TcL and a higher cutoff frequency BPF_TcH, wherein the branched output of the tracking error signal is supplied to the low-pass filter LPF and the band-pass filter BPF, wherein LPF_TcL and BPF_TcL are constant irrespective of the first and second linear velocities, and wherein BPF_FcH is switched one after another according to the ratio of the second linear velocity to the first linear velocity;

irradiating the optical information storage medium with light and rotating the optical information storage medium; and reading information from the optical information storage medium.

5. A method for inspecting an optical information storage medium and recording information on the optical information storage medium, the method comprising the steps of:

irradiating the optical information storage medium with a laser beam and rotating the storage medium by a constant linear velocity control technique by reference to the radial location at which the laser beam forms a spot on the storage medium;

changing the rotational velocities according to the radial location on the storage medium between at least two linear velocities that include a first linear velocity Lv1 and a second linear velocity Lv2, which is higher than the first linear velocity Lv1;

generating a focus error signal and/or a tracking error signal based on the light reflected from the storage medium;

performing a focus control and/or a tracking control on the laser beam that irradiates the storage medium based on the focus error signal and/or the tracking error signal;

passing branched outputs of the focus error signal and/or the tracking error signal through predetermined types of frequency band-elimination filters for the focus and/or tracking error signal(s) to obtain residual errors of the focus and/or tracking error signal(s) and comparing the residual errors to predetermined reference values, wherein the frequency band-elimination filter for the focus error signal includes a low-pass filter LPF with a cutoff frequency LPF_FcL and a band-pass filter BPF with a lower cutoff frequency BPF_FcL and a higher cutoff frequency BPF_FcH, wherein the branched output of the focus error signal is supplied to the low-pass filter LPF and the band-pass filter BPF, wherein if the optical information storage medium is rotated at the first and second linear velocities and subjected to the focus control to make a comparison to the predetermined reference value, LPF_FcL, BPF_FcL and BPF_FcH are switched one after another according to the ratio of the second linear velocity to the first linear velocity, wherein the frequency band-elimination filter for the tracking error signal includes a low-pass filter LPF with a cutoff frequency LPF_TcL and a band-pass filter BPF with a lower cutoff frequency BPF_TcL and a higher cutoff frequency BPF_TcH, wherein the branched output of the tracking error signal is supplied to the low-pass filter LPF and the band-pass filter BPF, wherein LPF_TcL and BPF_TcL are constant irrespective of the first and second linear velocities, and wherein BPF_FcH is switched one after another according to the ratio of the second linear velocity to the first linear velocity irradiating the optical information storage medium with light and rotating the optical information storage medium; and recording information on the optical information storage medium.

* * * * *

UNITED STATES PATENT AND TRADEMARK OFFICE
CERTIFICATE OF CORRECTION

PATENT NO. : 8,335,143 B2  
APPLICATION NO. : 13/204384  
DATED : December 18, 2012  
INVENTOR(S) : Atsushi Nakamura et al.

Page 1 of 1

It is certified that error appears in the above-identified patent and that said Letters Patent is hereby corrected as shown below:

Col. 44, line 11, --Lvl-- should be "Lv1"

Col. 44, line 13, --Lvl-- should be "Lv1"

Col. 45, line 1, --Lvl-- should be "Lv1"

Col. 45, line 3, --Lvl-- should be "Lv1"

Signed and Sealed this  
Second Day of April, 2013

Teresa Stanek Rea  
*Acting Director of the United States Patent and Trademark Office*